(12) United States Patent
Isomura

(10) Patent No.: US 6,374,310 B2
(45) Date of Patent: *Apr. 16, 2002

(54) SYSTEM FOR PROTECTING INFORMATION STORED IN A STORAGE APPARATUS ASSEMBLED INTO AN EQUIPMENT WHEN THE STORAGE APPARATUS IS REMOVED FROM THE EQUIPMENT UNAUTHORIZED

(75) Inventor: Hiroshi Isomura, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/089,507

(22) Filed: Jun. 3, 1998

(30) Foreign Application Priority Data

Dec. 16, 1997 (JP) ............................... 9-346019

(51) Int. Cl.[7] .............................. G06F 3/00; G06F 13/10
(52) U.S. Cl. ......................... 710/15; 713/200; 380/201
(58) Field of Search ......................... 710/15, 102, 103; 380/3, 4, 23, 25, 201; 713/200, 202

(56) References Cited

U.S. PATENT DOCUMENTS

| | | | |
|---|---|---|---|
| 4,720,700 A | * 1/1988 | Seibold et al. ............... 340/568 |
| 5,259,540 A | * 11/1993 | Kocznar et al. ............. 224/219 |
| 5,369,299 A | * 11/1994 | Byrne ......................... 257/638 |
| 5,418,761 A | * 5/1995 | Asano ............................ 369/6 |
| 5,465,099 A | * 11/1995 | Mitsui et al. ................ 343/730 |
| 5,572,696 A | * 11/1996 | Sonobe ........................ 711/202 |
| 5,610,981 A | * 3/1997 | Mooney et al. ................ 380/25 |
| 5,809,123 A | * 9/1998 | Reynolds ..................... 379/145 |
| 5,826,009 A | * 10/1998 | Feng ........................... 713/200 |
| 5,974,473 A | * 10/1999 | Leavitt et al. .................. 710/8 |

FOREIGN PATENT DOCUMENTS

JP  7-334272  12/1995

* cited by examiner

Primary Examiner—Thomas Lee
Assistant Examiner—Thuan Du
(74) Attorney, Agent, or Firm—Staas & Halsey LLP

(57) ABSTRACT

A battery is provided for supplying a power upon a removal from the equipment. When the removal from the equipment is detected by a connection detecting unit, an injustice judgment unit judges whether it is an unjust removal from the equipment or not. If it is judged that an unjust removal has taken place, a security processing unit performs an information protective action such as erasing of data of a storage unit, enciphering, saving into different areas, etc. In the event of incorporating no batteries, the protective action is effected by the supply of an external power through the reconnection.

23 Claims, 24 Drawing Sheets

F I G. 1
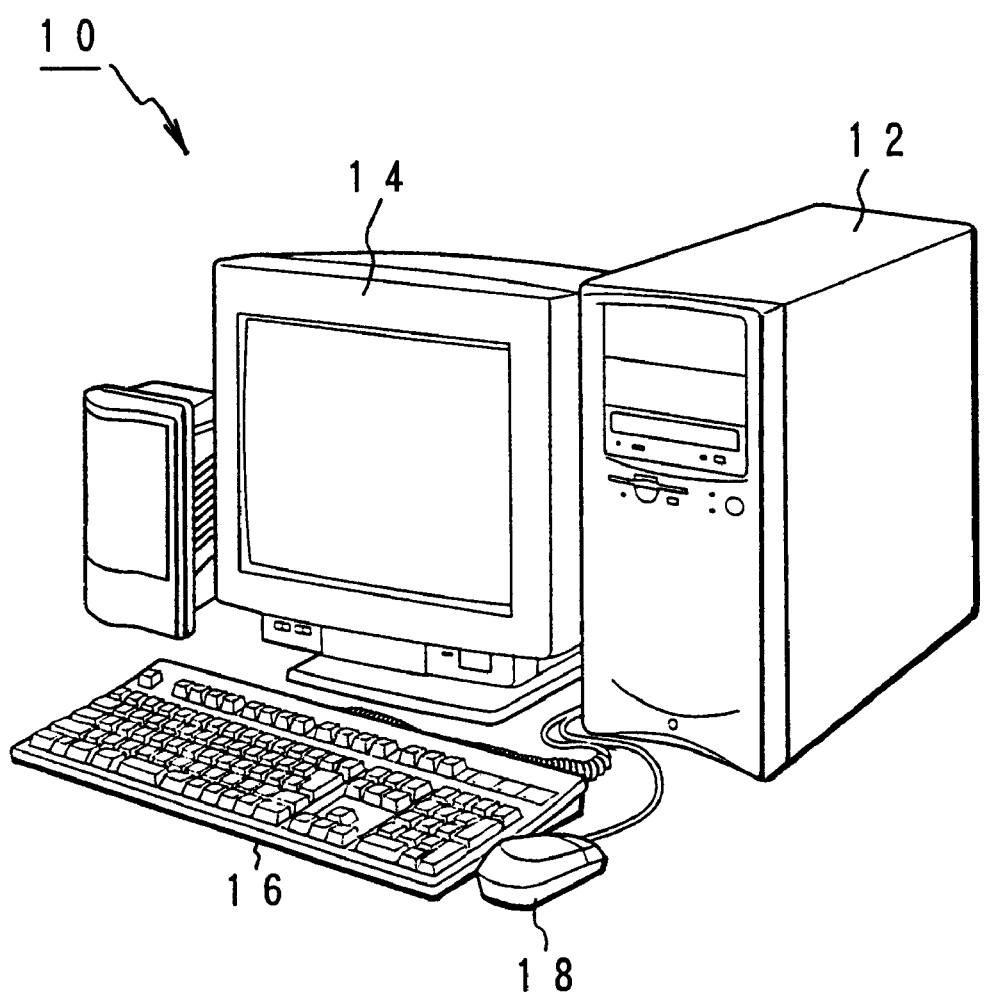

SYSTEM FOR PROTECTING INFORMATION STORED IN A STORAGE APPARATUS ASSEMBLED INTO AN EQUIPMENT WHEN THE STORAGE APPARATUS IS REMOVED FROM THE EQUIPMENT UNAUTHORIZED

BACKGROUND OF THE INVENTION

1. Field of the Invention

The present invention relates generally to a storage apparatus for equipment, intended to be detachably assembled into information equipment such as a personal computer in use, and more particularly to a storage apparatus for equipment for protecting stored information against an unjust handling.

2. Description of the Related Art

The security of information stored in information equipment such as a personal computer has been hitherto achieved under the control of a security system implemented by a software of the information equipment. For example, upon a power-on activation of the information equipment, the security system demands an input of a password to prevent a user having no access qualification from unjustly accessing.

However, in the case of the protection of the stored information by means of such a conventional password based security system, it would be possible for the user having no access qualification to access by employing procedures in which the information equipment is disassembled to remove an internal storage apparatus such as a memory board or a hard disk drive, which in turn is connected to another system to access the data within the storage apparatus.

SUMMARY OF THE INVENTION

According to the present invention, there is provided a storage apparatus for equipment capable of securely preventing an unjust access in which the equipment is disassembled to fetch the stored information.

A storage apparatus for equipment in accordance with the present invention is assembled into the equipment in use and comprises a storage unit for storing information; a connection detecting unit for detecting a removal from the equipment; an injustice judgment unit for judging when the connection detecting unit has detected a removal from the equipment whether it is an unjust removal or not; and a security processing unit for executing an action for protecting the information of the storage unit when the injustice judgment unit has judged that an unjust removal has taken place. When the storage apparatus itself has judged that it has been unjustly removed, a protecting action is effected which prevents the data of the storage unit from being fetched to the exterior using the internal battery as a power source, thereby making it possible to remarkably improve the data security performance of the storage apparatus.

A battery is further provided which is incorporated for supplying an electric power upon the removal from the apparatus.

The injustice judgment unit is provided with a switch which is required to be mechanically operated upon a removal from the equipment, the injustice judgment unit judging that an unjust removal has taken place when the switch has been removed without any operation or with an incorrect operation, to effect the protection of the information. For this reason, only one who knows a correct procedure to operate the switch is allowed to normally fetch the stored information to the exterior, prohibiting the information from being unjustly fetched from the storage apparatus through the disassembling of the equipment. The injustice judgment unit is provided with a register which is required to be operated by a software upon a removal from the equipment, the injustice judgment unit judging that an unjust removal has taken place when the register has been removed without any operation or with an incorrect operation. In this case as well, only one who knows a correct procedure to operate the register is allowed to normally fetch the stored information to the exterior, thereby securely preventing the information from being unjustly fetched from the storage apparatus through the disassembling of the equipment. A storage control unit is further provided which controls read and write of information from and to the storage unit. The security processing unit is provided with a data destruction unit for writing meaningless data into the storage unit to destroy the original data when it is judged that an unjust removal has taken place. The security processing unit may be provided with an encipher unit for enciphering the data of the storage unit when it is judged that an unjust removal has taken place. In the case where the encipher unit has been provided, a decoding unit may be provided if necessary for restoring data enciphered by the encipher unit into original data.

The storage unit is provided with a first storage unit (first storage area) for use in an ordinary state and a second storage unit (second storage area) out of use in the ordinary state, and the security processing unit is provided with a data destruction unit which when it is judged that an unjust removal has taken place, copies data of the first storage area into the second storage area and writes meaningless data to the first storage area to thereby destroy the original data. In this instance, a data recovery unit may further be provided for returning data stored in the second storage area into the first storage area. A buffer storage unit may be disposed between the storage unit and an equipment connection terminal unit, and the security processing unit is provided with a buffer data conversion unit which when data are fetched via the buffer storage unit from the storage unit after the judgment of an unjust removal, converts them into meaningless data in the buffer storage unit. In this case, a conversion inhibition unit may be provided for inhibiting the conversion by the buffer data conversion unit into meaningless data. The security processing unit may be provided with a circuit destruction unit which when it is judged that an unjust removal has taken plate, destroys physically a circuit function at a predetermined site of the apparatus to thereby disable the read control unit for a data read from the storage unit, the physical destruction including for instance electric short, mechanical breakage, thermal breakage by heating, etc.

The present invention is also directed to a storage apparatus for equipment incorporating no batteries, which in this case comprises a storage unit for storing information; a connection detecting unit for detecting a removal from the equipment; an injustice judgment unit for judging when the connection detecting unit has detected a removal from the equipment whether it is an unjust removal from the equipment or not; and a security processing unit for executing an action for protecting the information of the storage unit upon the reconnection after the injustice judgment unit has judged that an unjust removal has taken place. In the case of no batteries incorporated, the security processing unit is provided with a read inhibition unit for inhibiting the storage control unit from reading data from the storage unit upon the reception of a read demand from the exterior as a result of reconnection after the injustice judgment unit has judged that an unjust removal has taken place. The securing processing unit is further provided with an inhibition release unit for releasing a read inhibiting action against a read demand from the storage control unit by the read inhibition unit.

A storage apparatus for equipment, having no batteries and assembled into the equipment in use, comprises a storage unit for storing information; a connection detecting unit for detecting a removal from the equipment; an injustice judgment unit for judging when the connection detecting unit has detected a removal from the equipment whether it is an unjust removal or not; an unjust removal storage unit which when the injustice judgment unit has judged that an unjust removal has taken place, stores and holds the unjust removal; and a security processing unit which when it has been enabled for action by the supply of external power as a result of reconnection to the equipment after the removal, executes an action for protecting the information of the storage unit on the basis of memory of the unjust removal.

A storage apparatus having no batteries and assembled into equipment in use comprises a storage unit for storing information; an unjust removal notice unit for judging an unjust removal from an initial motion upon the removal from the equipment to notify the user of it in advance; and a security processing unit for executing an action for protecting the information of the storage unit on the basis of the notice of an unjust removal before the actual removal from the equipment, in the pre-removal external power supply state connected to the equipment. The storage apparatus to which the present invention is directed can be for example in the form of a memory card or a hard disk drive which is freely attachable to and detachable from the equipment.

The above and other objects, features and advantages of the present invention will become more apparent from the following detailed description with reference to the accompanying drawings.

BRIEF DESCRIPTION OF THE DRAWINGS

FIG. 1 is an explanatory diagram of a personal computer to which the present invention is applied;

DETAILED DESCRIPTION OF THE PREFERRED EMBODIMENTS

Figure 2:
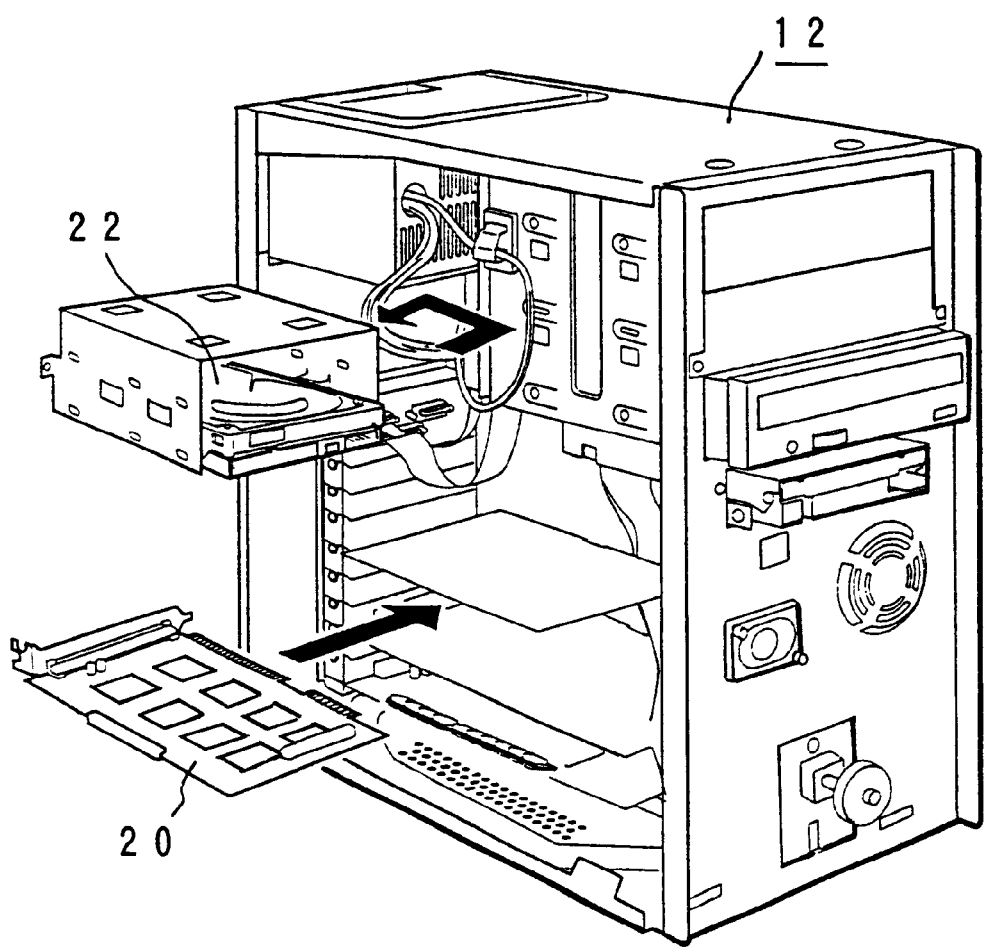
FIG. 2 is an explanatory diagram of a storage apparatus incorporated into the body of the personal computer of FIG. 1.

FIG. 1 illustrates a personal computer to which is applied a storage apparatus in accordance with the present invention. The personal computer is generally designated at 10 and comprises a tower-type personal computer body 12, a display 14, a keyboard 16 and a mouse 18. As shown in FIG. 2, the personal computer body 12 is mounted therein with a memory board 20 serving as the storage apparatus and a hard disk drive 22. In the present invention, the memory board 20 serving as the storage apparatus stored in the personal computer body 12 and the hard disk drive 22 are equipped with their respective stored information protection functions against unjust removal.

Figure 3:
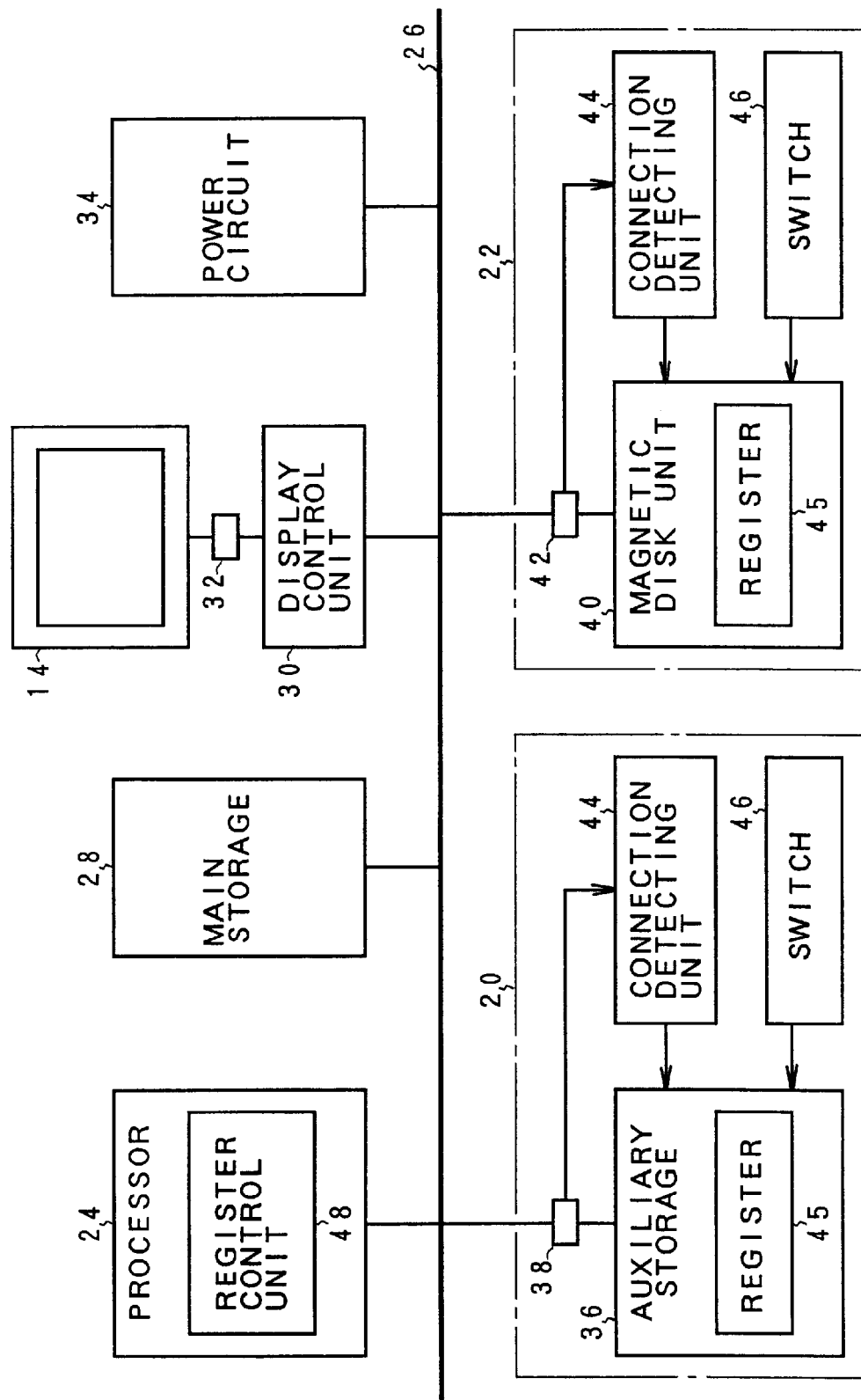
FIG. 3 is a circuit block diagram of the body of the personal computer of FIG. 2.

FIG. 3 is a block diagram illustrating a hardware configuration of the personal computer body 12 of FIG. 1. The personal computer body 12 comprises a processor 24 having a bus 26 to which are connected a main storage 28, a display controller 30, the memory board 20 serving as the storage apparatus and the hard disk drive 22. A display 14 is connected via a connector terminal unit 32 to the display controller 30. A power circuit 34 is also provided which acts under a control of the processor 24 through the bus 26. The memory board 20 incorporates therein a storage apparatus 36 of the present invention, which is connected via a connector terminal unit 38 to the bus 26 of the processor 24. The memory board 20 includes a connection detecting unit 44, a register 45 and a switch 46. The connection detecting unit 44 detects a removal from and a loading to the bus 26, of the memory board 20, through the connector terminal unit 38. For instance, the connection detecting unit 44 supervises a pull-up line of a power supply voltage from the bus 26 to the connector terminal unit 38, and when the connector terminal unit 38 is removed from the bus 26, the pull-up voltage is interrupted allowing a removal of the memory board 20 to be detected. The switch 46 is operated when the memory board 20 is removed from the bus 26. For the operation of the switch 46, its switch knob can basically be turned into on or off position. Instead of the on operation or off operation of the switch 46, predetermined operating procedures of the switch 46 could be defined. The operating procedures of the switch 46 upon the removal of the memory board 20 include I. Acting on the switch 46 a predetermined number of times; and II. Continuing to act on the switch 46 for a predetermined period of time or more.

When the switch 46 is operated in accordance with one of the predetermined operating procedures, the storage apparatus 36 judges that a proper removal operation has been performed from a detection of the removal from the connector terminal unit 38 by the connection detecting unit 44, not allowing the stored information protecting action to be carried out. Contrary to this, in cases where the switch 46 has not been operated or where no operation has been performed in accordance with predetermined operating procedure, it is judged that an unjust removal has been effected, allowing the stored information protecting action to be carried out. The stored information protecting action in the storage apparatus 36 upon an unjust removal will be described later in greater detail. The memory board 20 is provided with the register 45 operated by a software in addition to the switch 46 for effecting the mechanical removal operation. The register 45 can be used to judge an unjust removal through the storage operation of a predetermined register value by a register control unit 48 executing a register operation program of the processor 24. That is, upon a detection by the connection detecting unit 44 of the removal from the connector terminal unit 38 of the memory board 20, the register 45 is referred to, and when a predetermined register value has not been stored or an erroneous register value has been stored, it is judged that an unjust removal has occurred, allowing the stored information protecting action to be carried out. Since the hard disk drive 22 also constitutes a part of the storage apparatus of the present invention, it is provided with the connection detecting unit 44, the register 45 and the switch 46 in the same manner as the memory board 20 is. In the case of the hard disk drive 22 as well, upon a detection by the connection detecting unit 44 of the removal from the connector terminal unit 42, the switch 46 or the register 45 is referred to, and when a predetermined switching operation has not been performed or an erroneous operation has been performed, or when no register value has been stored or an erroneous register value has been stored, it is judged that an unjust removal has occurred, allowing the stored information protecting action to be carried out.

Figure 4:
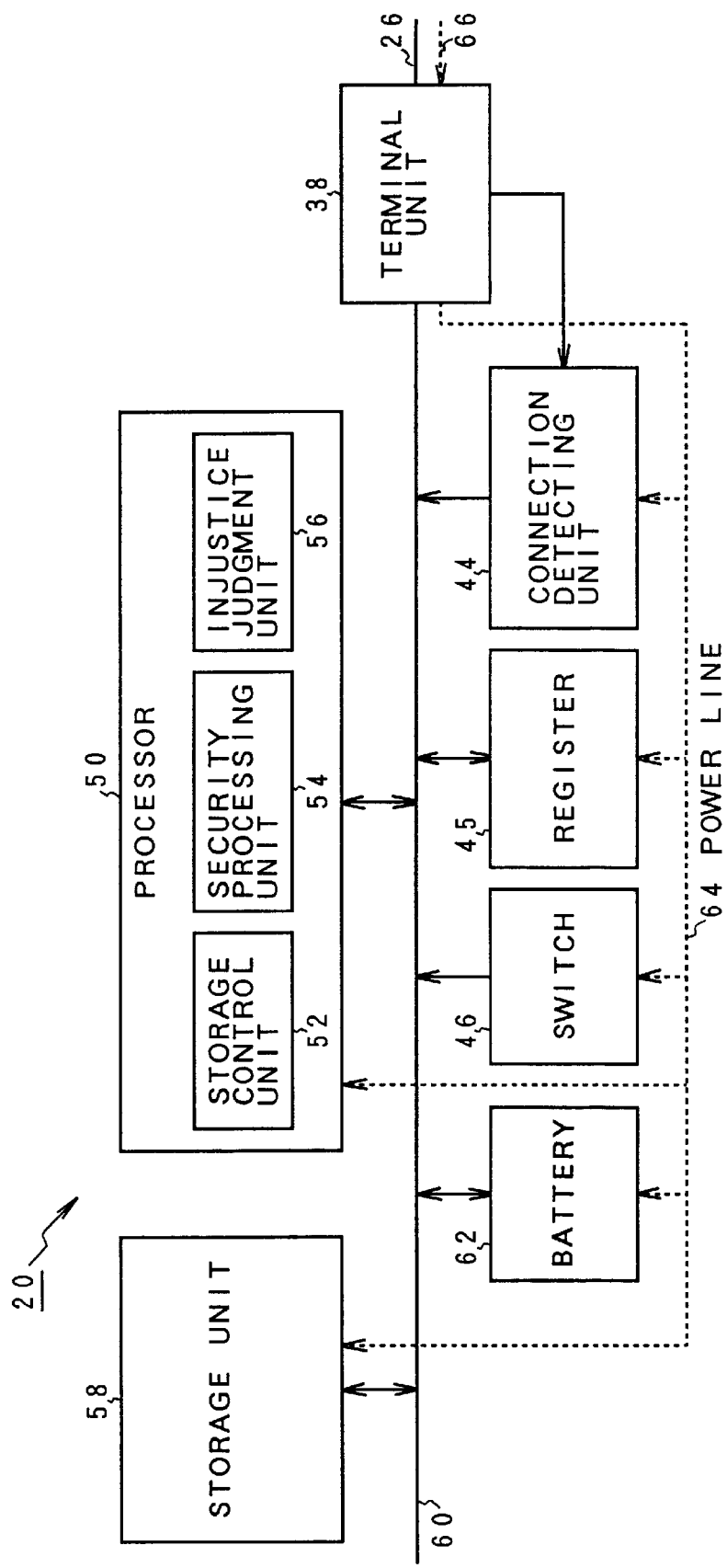
FIG. 4 is a circuit block diagram of the present invention which is applied to a memory card of FIG. 2.

FIG. 4 illustrates a hardware configuration of the storage apparatus of the present invention including the connection detection unit 44 and the switch 46 in the case of the memory board 20 of FIG. 3 by way of example. Within the memory board 20 serving as the storage apparatus there is provided a processor 50 serving as a control unit and having a bus 60 to which a storage unit 58 is connected. The processor 50 is provided with a storage control unit 52 which accesses the storage unit 58 to perform read or write of data in response to an access request from an external bus 26 connected via the connector terminal unit 38. In the present invention, such a memory board 20 for the storage is provided with the connection detecting unit 44, the register 45, the switch 46 and a battery 62, and further comprises as processing features a security processing unit 54 and an injustice judgment unit 56. The connection detecting unit 44 detects a removal and loading of the memory board 20 from and into the connector terminal unit 38, and posts the processor 50 and the battery 62 of the detection results. The battery 62 may be posted of the detection of removal by way of the processor 50. Upon the receipt of the post of the removal detection, the battery 62 is switched into an internal battery power supply mode. The internal battery of the battery 62 can be a unitary battery such a lithium battery or a secondary battery such as a capacitor charged by a power supply from the bus 26 side. To this end, the battery 62 is connected via an internal power line 64 and via the connector terminal unit 38 to an external power line 66. For this reason, even though the memory board 20 has been removed from the bus 26 associated with the personal computer body, the mode is switched into the battery 62 power supply mode so that the internal circuit can be put into the operative condition. The removal detection post received by the processor 50 is imparted to the injustice judgment unit 56 serving as one of the control functions of the processor 50. Upon the reception of the removal detection post from the connection detecting unit 44, the injustice judgment unit 56 judges whether an unjust removal has been performed or not. In order to judge this unjust removal, the memory board 20 is provided with the register 45 and the switch 46. Although in this embodiment the software operated register 45 and the mechanically operated switch 46 are provided, one of the both can practically be provided. In this embodiment, judgment is made from the operative condition of the switch 46 of whether any unjust removal has been performed or not by way of example. Upon the reception of the removal detection post from the connection detecting unit 44, the injustice judgment unit 56 refers to the operative condition of the switch 46. When removing the memory board 20, the personal computer user knows the procedure of the operation for the removal, so that the removal is performed through the operation defined for the switch 46. In this case, the injustice judgment unit 46 refers to the switch 46 to detect that the switch 46 has been operated or that a correct operation has been carried out, and since no unjust removal has been effected, instructs the battery 62 of the procedure of the power supply. Contrary to this, in cases where when the injustice judgment unit 56 has referred to the switch 46, any switching operation has been not performed, or any correct operation has not been carried out, it is judged that an unjust removal has occurred, and the security processing unit 54 is activated to allow stored information protecting action of the storage unit 58. After the completion of the protecting action of the storage unit 58 by means of the security processing unit 54, the battery 62 is instructed of the cease of the power supply to terminate the processing.

Figure 5:
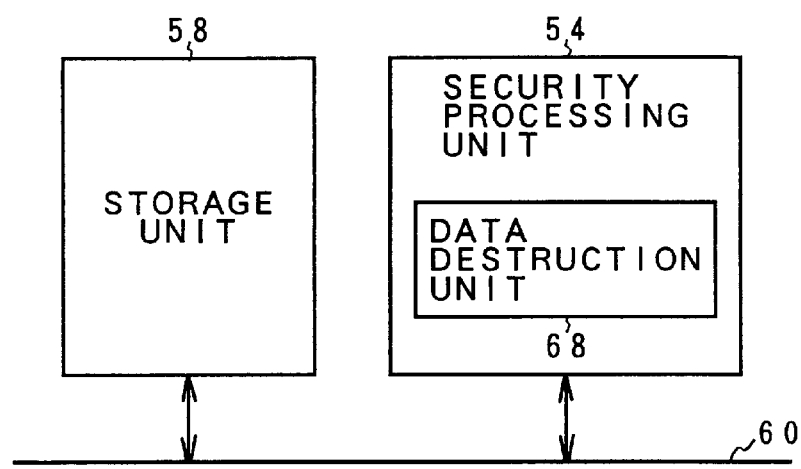
FIG. 5 is a function block diagram of a security processing unit of FIG. 4 for converting data of a storage unit into meaningless data.

FIG. 5 illustrates an embodiment of the protecting action of the storage unit 58 effected by the security processing unit 54 of FIG. 4 upon the judgment of the unjust removal. The security processing unit 54 is provided with a data destruction unit 68. Upon the reception of the post of the judgment of the unjust removal, the data destruction unit 68 is activated to execute the data destruction processing for rendering the data stored in the storage unit 58 into meaningless data. More specifically, the data of the storage unit 58 are subjected to erasing processing for rendering all data into bit 0 or to random number data writing processing, to be thereby destroyed into compulsory arbitrary data. By virtue of this, even though the memory board 20 has been unjustly removed to fetch the storage data of the storage unit 58, there can be securely prevented an unjust utilization of the stored data since the data destruction of the storage unit 58 is performed upon the unjust removal of the memory board 20.

Figure 6:
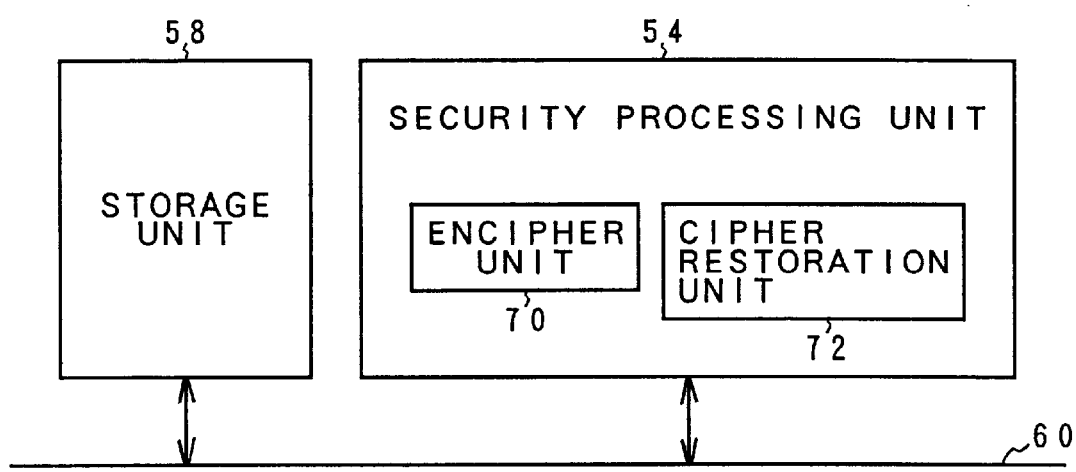
FIG. 6 is a function block diagram of the security processing unit of FIG. 4 for enciphering data of the storage unit.

FIG. 6 illustrates another embodiment of the storage protecting action of the storage unit 58 effected by the security processing unit 54 of FIG. 4. This embodiment is characterized in that the security processing unit 54 is provided with an encipher unit 70. The encipher unit 70 is activated upon the reception of the post of the unjust removal judgment and enciphers the storage data of the storage unit 58 in conformity with a predetermined encipher algorithm to replace all the original data by encipher data. In the case of enciphering the data of the storage unit 58 by means of the encipher unit 70, the redundancy of the data tends to be in general increased to add to the amount of data. For this reason, taking into consideration the increase of the amount of data upon the enciphering, the storage unit 58 is provided with a spare storage area in the form of a space area, so as to be able to allow for the increase of the mount of data which may be caused by the enciphering. The storage capacity of the encipher data may be reduced by subjecting the encipher data to compression processing in conformity with a predetermined compression algorithm. In the case of the embodiment of FIG. 6 in this manner, when it is judged that an unjust removal has occurred, all the data of the storage unit 58 are replaced by the encipher data, so that even though the data have been read from the storage unit 58, the data result in meaningless data due to the enciphering, thereby making it possible to securely prevent the storage data from being utilized unjustly. The security processing unit 54 of FIG. 6 may be provided with an encipher restoration unit 72 in addition to the encipher unit 70. After the protection of the stored information through the replacement of the data stored in the storage unit 58 with the encipher data against the unjust removal by means of the encipher unit 70, the encipher restoration unit 72 is utilized when it is desired to again load the memory board 20 into the personal computer to restore the storage unit 58 into its original state in cases where the memory board 20 remains left as a result of failure of the unjust fetch of the stored data. This encipher restoration unit 72 can be activated through an encipher restoration command issued by the processor 50 of FIG. 4, under the state in which the data stored in the storage unit 58 have been replaced with the encipher data by means of the encipher unit 70. It is desirable in this case that a cipher key proper to the user is defined for use to activate the encipher restoration unit 72.

Figure 7:
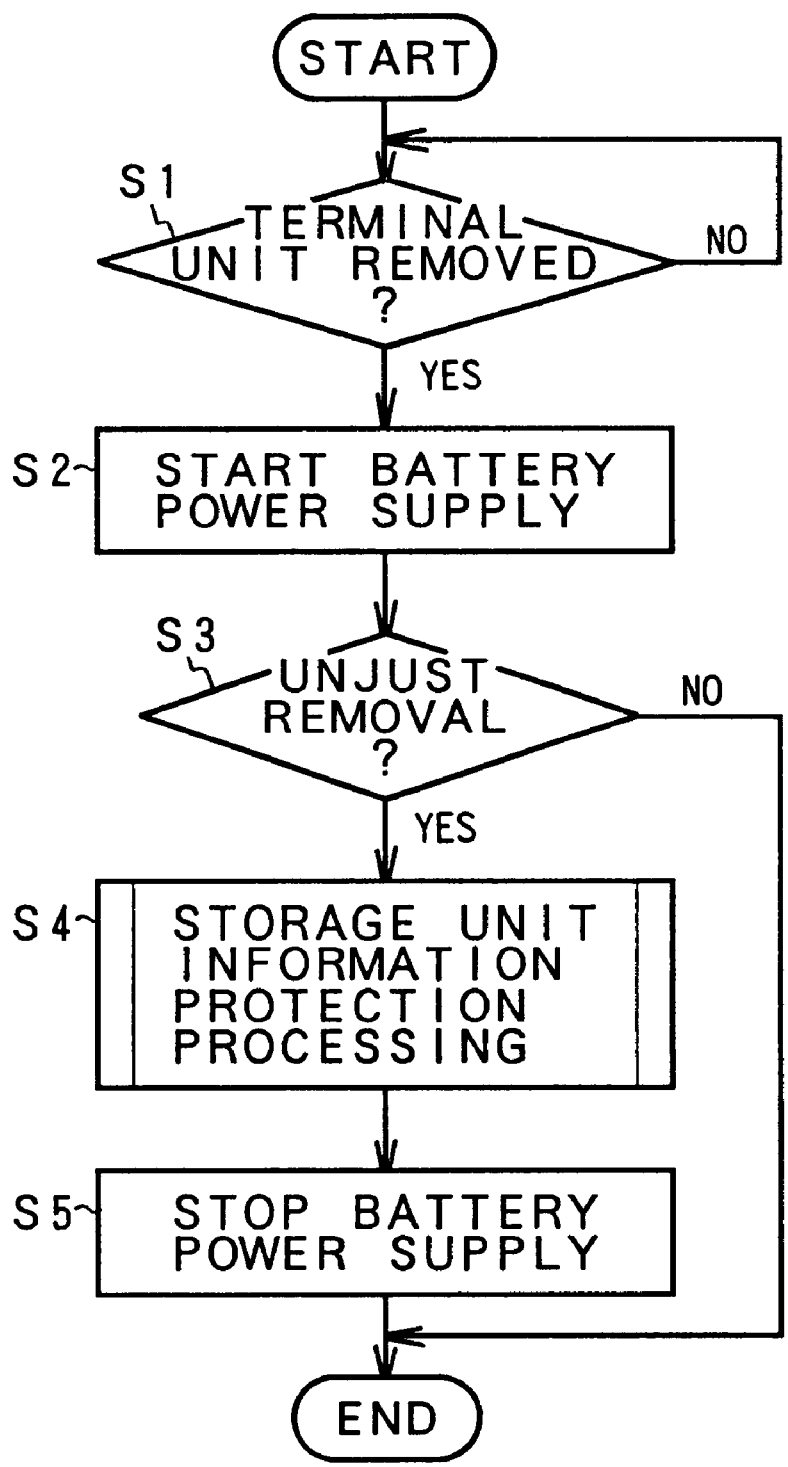
FIG. 7 is a flowchart of a processing action performed when the storage apparatus has been removed from the equipment.

A flowchart of FIG. 7 illustrates a processing action of the present invention implemented by the memory board 20 of FIG. 5. In step S1, a check is made to see if the connector terminal unit 38 has been removed or not, that is, if a post of a removal detection has been issued from the connection detecting unit 4. When it is judged that the connector terminal unit has been removed, the procedure goes to step S2 to start a power supply of the battery 62. Then in step S3, it is judged by the injustice judgment unit 56 whether an unjust removal has occurred or not. If the unjust removal has occurred, then the procedure goes to step S4 to execute the information protecting processing of the storage unit. That is, the protecting actions are made which include the destruction of data of the storage unit 58 by the data destruction unit 68 of FIG. 5 or replacement of the data of the storage unit 58 with encipher data by the encipher unit 70 of FIG. 6. After the completion of the protecting action, the power supply of the battery 62 is stopped in step S5. It is natural that it has not been judged in step S3 that an unjust removal has occurred, the information protecting processing of the storage unit 58 in step S4 is skipped, allowing the power supply from the battery 62 to be stopped in step S5.

Figure 8:
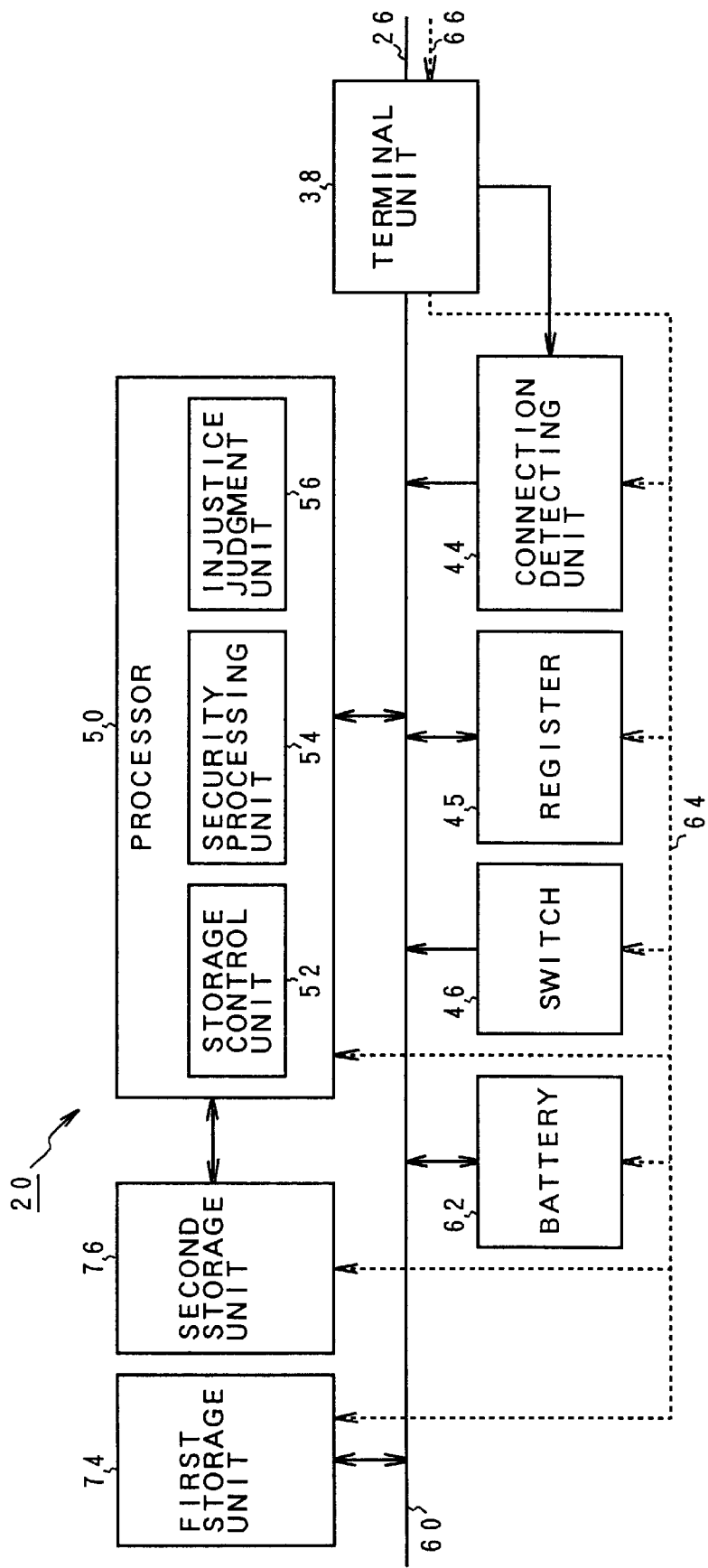
FIG. 8 is a block diagram of another embodiment of the present invention, in which the storage unit is divided into two areas.

FIG. 8 is a block diagram of another embodiment of the storage apparatus in accordance with the present invention in the form of the memory board 20 of FIG. 3 by way of example. This embodiment is characterized in that the storage unit of the memory board 20 comprises a first storage unit 74 connected to the bus 60 to allow a read and write of data at ordinary time, and a second storage unit 76 for saving data of the first storage unit 74 upon the detection of an unjust removal. While the first storage unit 74 is connected to the bus 60, the second storage unit 76 for saving data upon the unjust removal is separated from the bus 60 and is connected directly to another control bus provided by the processor 50. On the basis of an external read or write access demand to the bus 60 by way of the connector terminal unit 38, the storage control unit 52 of the processor 50 controls a read from or a write to the first storage unit 74. An access to the second storage unit 76 can not be effected through an ordinary external access demand. In order to judge an unjust removal of the memory board 20 and to protect the stored data, the processor 50 is provided with the security processing unit 54 and the injustice judgment unit 56. The bus 60 is associated with the connection detecting unit 44, the register 45, the switch 46 and the battery 62. Excepting the security processing unit 54, other functions for the stored information protection are the same as those of FIG. 5 embodiment.

Figure 9:
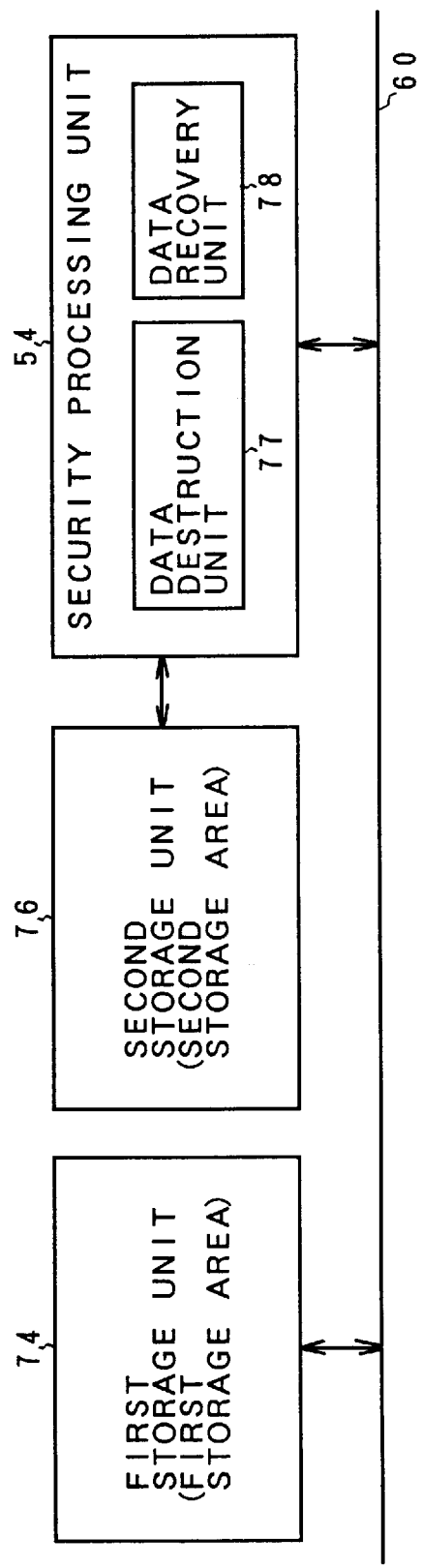
FIG. 9 is a function block diagram of the security processing unit of FIG. 8.

The security processing unit 54 has a processing function of FIG. 9. That is, the security processing unit 54 is provided with a data destruction unit 77. This data destruction unit 77 is activated when the injustice judgment unit 56 of FIG. 8 judges that the memory board 20 has unjustly been removed, and copies the stored data of the first storage unit 74 to the second storage unit 76, after which the stored data of the first storage unit 74 are rendered into meaningless data, for instance, all the data being rendered into bit 0 data or converted into random number data, to destroy the data. For this reason, even though the unjustly removed memory board 20 has been connected to another personal computer to access the first storage unit 74, only the destroyed meaningless data are obtained. The original data are saved in the second storage unit 76 so that as long as the security processing unit 54 recognizes that an unjust removal has been judged, the second storage unit 76 neglects an external access demand if any, preventing the second storage unit 76 from being referred to through an external access demand. The security processing unit 54 of FIG. 9 is further provided with a data recovery unit 78. The data recovery unit 78 executes data recovery processing in which data saved in the second storage unit as a result of an unjust removal are transferred to the original first storage unit 74 for restoration. The data recovery unit 78 is activated through the input of a predetermined encipher key via the processor 50 by the user, allowing the execution of the data recovery.

Figure 10:
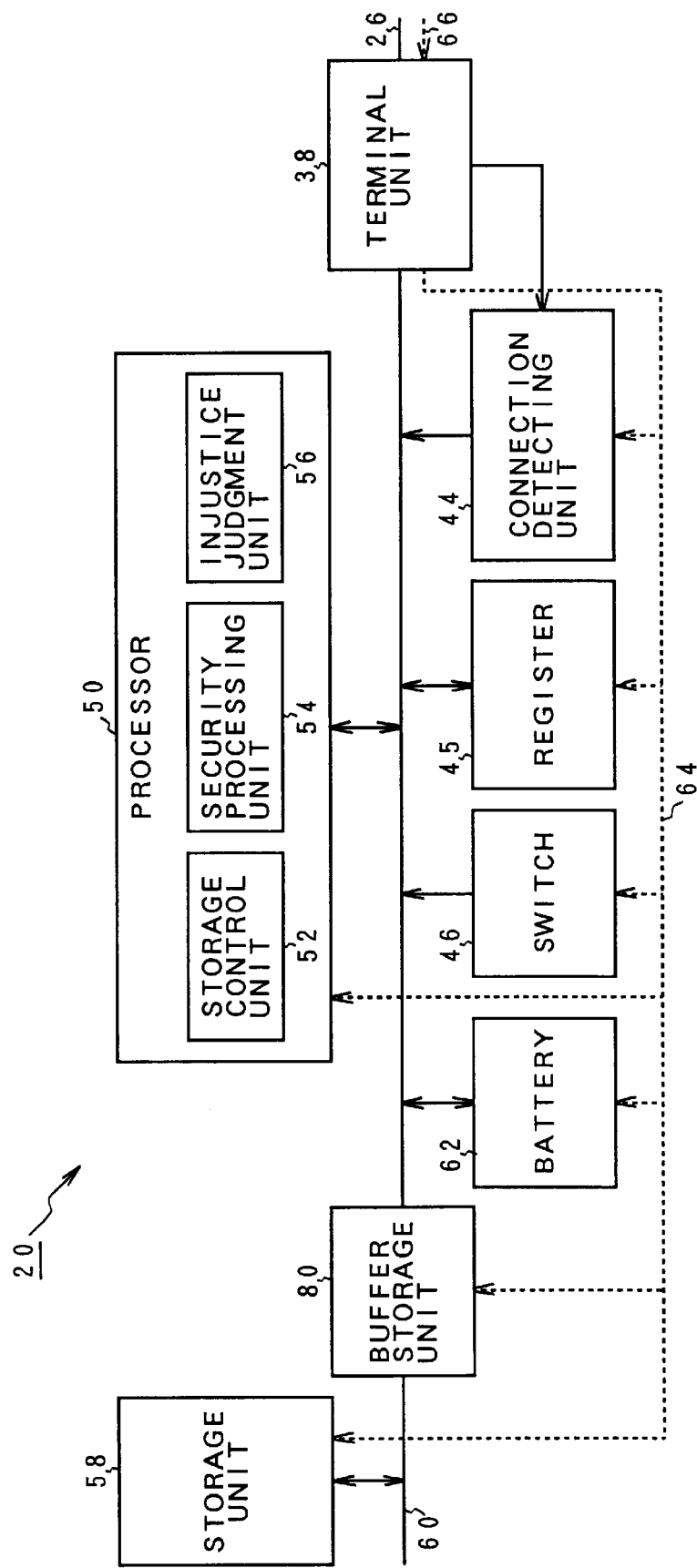
FIG. 10 is a block diagram of a further embodiment of the present invention, using a buffer storage unit.

FIG. 10 illustrates another embodiment of a storage apparatus of the present invention in the form of the memory board 20 of FIG. 3. This is characterized in that a buffer storage unit is provided in the halfway of a path for reading from or writing to the storage unit in response to an external access, the buffer storage unit being used to perform the information protecting action. At the ordinary time where it is loaded into the personal computer, the processor 50 executes the read from or write to the storage unit 58 in response to an external access demand, with the data input or output in this case passing through the buffer storage unit 80, which buffer transfers to allow the intact output of the input data. Contrary to this, when the injustice judgment unit 56 of the processor 50 has judged from the operative condition of the register 45 or the switch 46 that an unjust removal has occurred, the security processing unit 54 is activated so that upon the reception of an external demand to read the storage unit 58, the read data can be converted into meaningless data at the time of transfer of the read data by the buffer storage unit 80.

Figure 11:
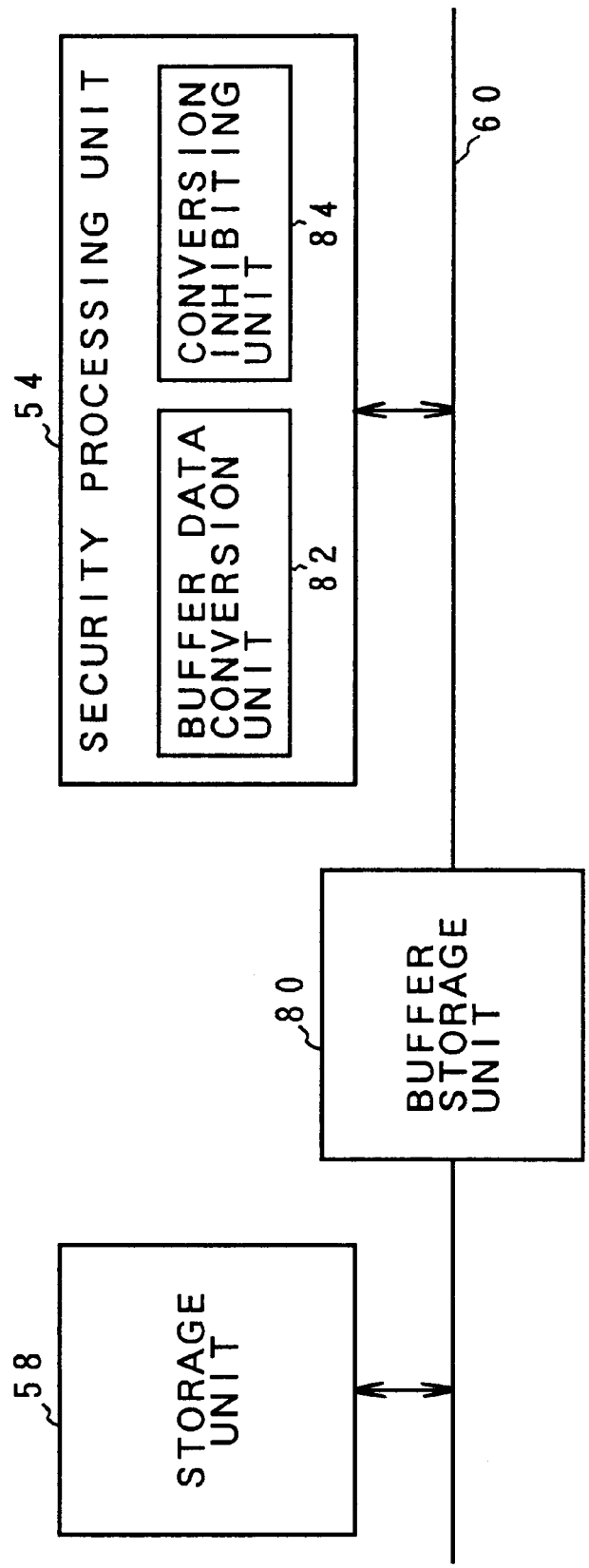
FIG. 11 is a function block diagram of the security processing unit of FIG. 10.

FIG. 11 is a function block diagram of the security processing unit 54 of FIG. 10. The security processing unit 54 is provided with a buffer data conversion unit 82. Upon the reception of a post of judgment of an unjust removal, the buffer data conversion unit 82 is activated and, in response to an external read demand, stores read data read from the storage unit 58 into the buffer storage unit 80, after which upon the read transfer it performs buffer data conversion processing in which input storage data are erased into all bits 0 or converted into random number data. For this reason, even though the unjustly removed memory board has been connected to another personal computer to read data from the storage unit 58, the read data are converted into meaningless data when they pass through the buffer storage unit 80, prohibiting the original data from being read. The security processing unit 54 is further provided with a conversion inhibiting unit 84. The conversion inhibiting unit 84 inhibits an action converting the transfer data of the buffer storage unit 80 into meaningless data by the buffer data conversion unit 82. In the case where user desires to restore the memory board 20 into its original state after the execution of the unjust removal, the conversion inhibiting unit 84 is activated through a predetermined cipher key designated by the processor 50 to interrupt the function of the buffer data conversion unit 82, making it possible to restore the buffer storage unit 80 into its original data transfer state.

Figure 12:
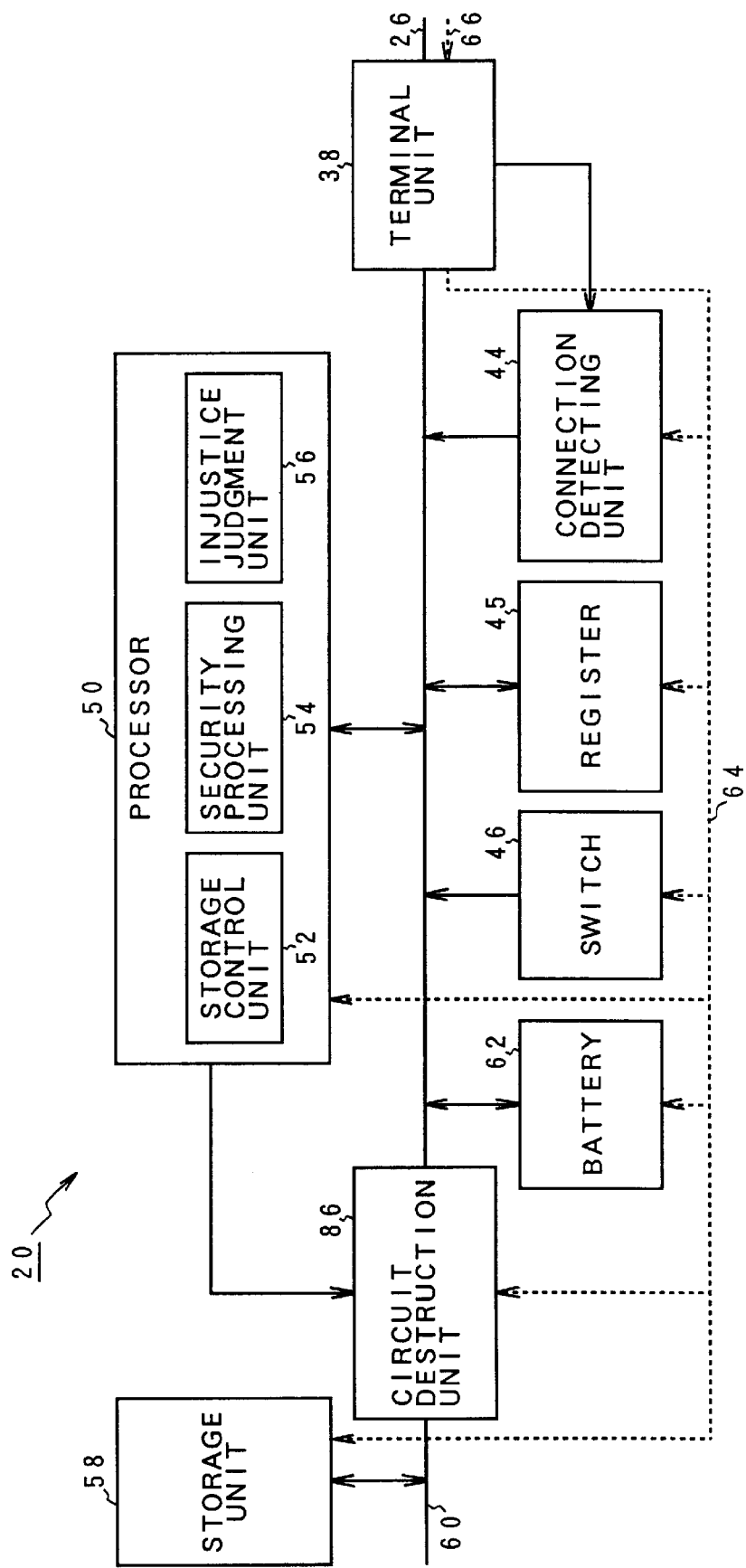
FIG. 12 is a block diagram of a further embodiment of the present invention in which the circuit is destroyed for protection.

FIG. 12 illustrates a further embodiment of the storage apparatus of the present invention in the form of the memory board 20 of FIG. 3. This embodiment is characterized in that upon the judgment of an unjust removal a part of the circuit within the memory board 20 is physically destroyed into the state in which data are not allowed to be read. A circuit destruction unit 86 is provided in the midway of the bus 60 serving as a data transmitting path for the storage unit 58. The circuit destruction unit 86 performs a circuit destroying action in response to an action signal for the stored information protection from the security processing unit 54 when the injustice judgment unit 56 of the processor 50 has judged from the operative condition of the register 45 or the switch 46 that an unjust removal has occurred, and destroys the transmission function of the bus 60, disabling an external access to the storage unit 58.

Figure 13:
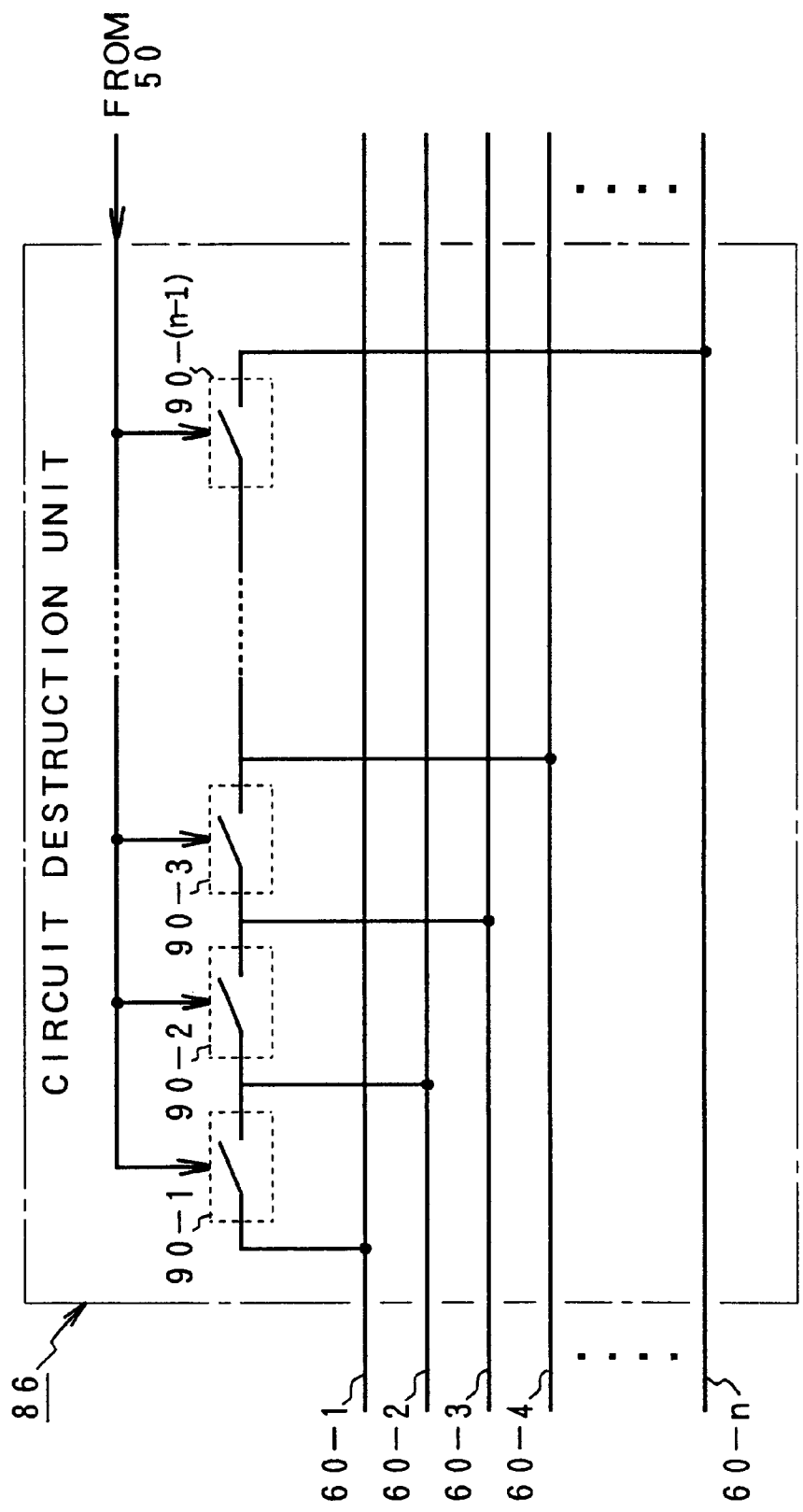
FIG. 13 is a circuit diagram of a circuit destruction unit of FIG. 12.

FIG. 13 is a circuit diagram of the circuit destruction unit 86 of FIG. 12. This circuit destruction unit 86 makes it possible to switch the mutual connections between a plurality of bus lines 60-1 to 60-n constituting the bus 60 into short circuit conditions by means of short circuit switches 90-1, 90-2, 90-3, . . . 90 (n−1). The short circuit switches 90-1 to 90-(n−1) can be analog switches such as transistors or FETs. The circuit destruction unit 86 is not limited to the circuit of FIG. 13 but can be any circuit destruction unit as long as it is able to short and destroy any appropriate circuit units by use of the short circuit switches. The short circuit switches may be replaced by a pressure boosting circuit which generates an overvoltage exceeding a prescribed voltage limit to destroy the circuits. A heater wire or the like may be arranged in the vicinity of the circuit unit or the like of the input/output driver for the bus 60 to thereby heat destroy the driver or the like through the energization of the heater wire.

Figure 14:
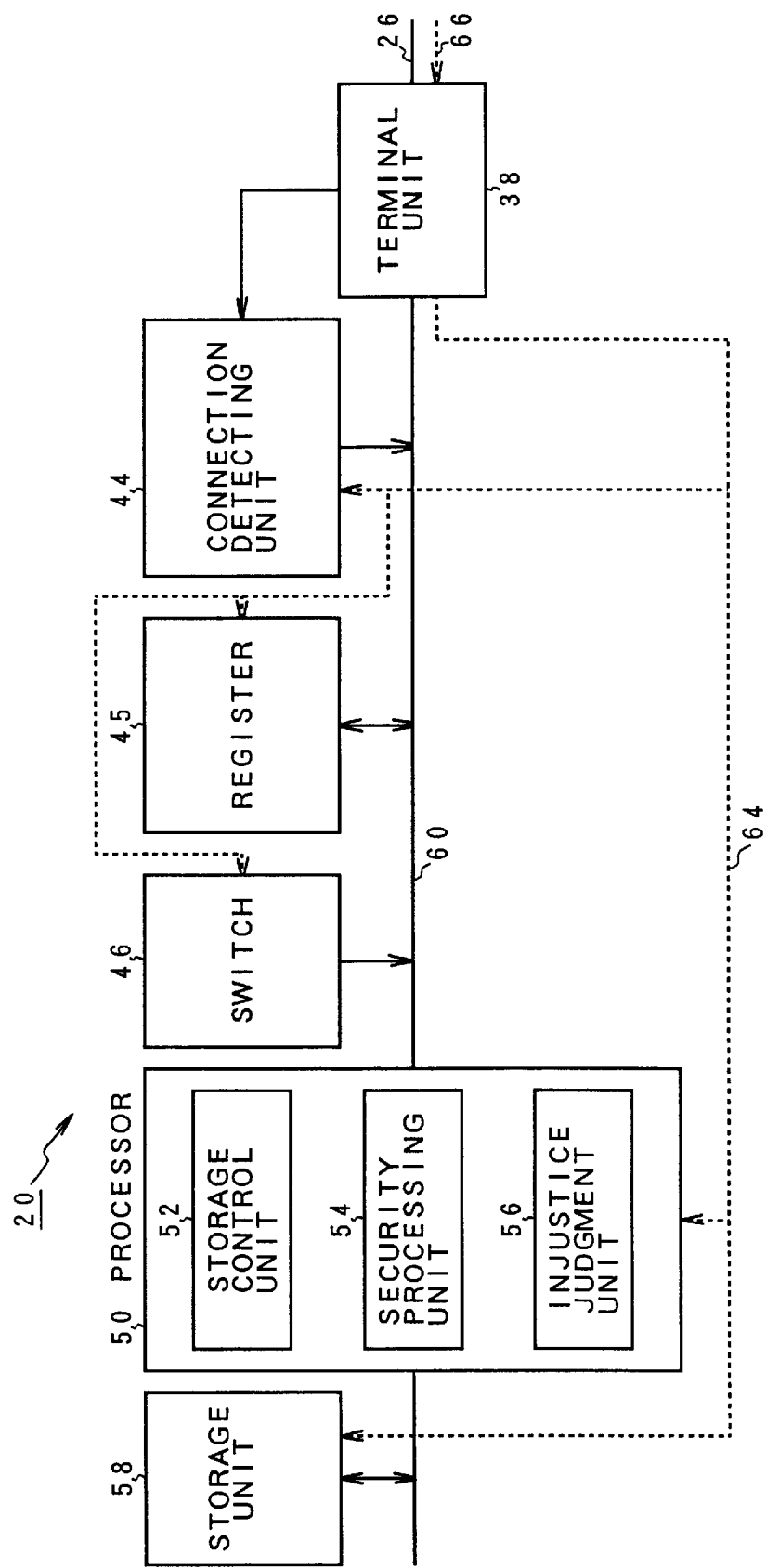
FIG. 14 is a block diagram of an embodiment of the present invention, which incorporates no batteries.

FIG. 14 illustrates a still further embodiment in accordance with the present invention in the form of the memory board 20 of FIG. 3. This embodiment is characterized in that the stored information protecting action against the unjust removal is carried out without incorporating the battery. Within the memory board 20 there are provided the processor 50 and the storage unit 58 as well as the connection detecting unit 44 for detecting an unjust removal, the removal register 45 and the switch 46, with the processor 50 being provided with the functions of the storage control unit 52, the security processing unit 54 and the injustice judgment unit 56, but without the battery 62 as in the embodiment of FIG. 4 for instance. For this reason, when the memory board is removed, there is interrupted a power supply to the connector terminal unit 38 through the external power line 66. As a result of this, in the state where the power supply has been interrupted due to the removal, the protecting actions by the injustice judgment unit 56 or the security processing unit 54 are not performed as in the case where the battery has been incorporated, allowing the switch 46 to be operated or put in a correct operative condition if an unjust removal has not occurred, but allowing the switch 46 to be inoperative or put in an incorrect operative condition if an unjust removal has occurred. The stored information protecting action against the unjust removal is performed after the removed memory board 20 has been again connected to the personal computer side to receive a power supply from the external power line 66. That is, when the connection detecting unit 44 detects the reconnection to the connector terminal unit 38, the injustice judgment unit 56 of the processor 50 is activated to check the operative condition of the switch 46, and if the switch 46 is inoperative or is put in an incorrect condition, judges that an unjust removal has occurred to activate the security processing unit 54.

Upon the reception of a post of detection of an unjust removal judgment, the security processing unit 54 rejects all subsequent read demands to the storage unit 58 from the exterior.

Figure 15:
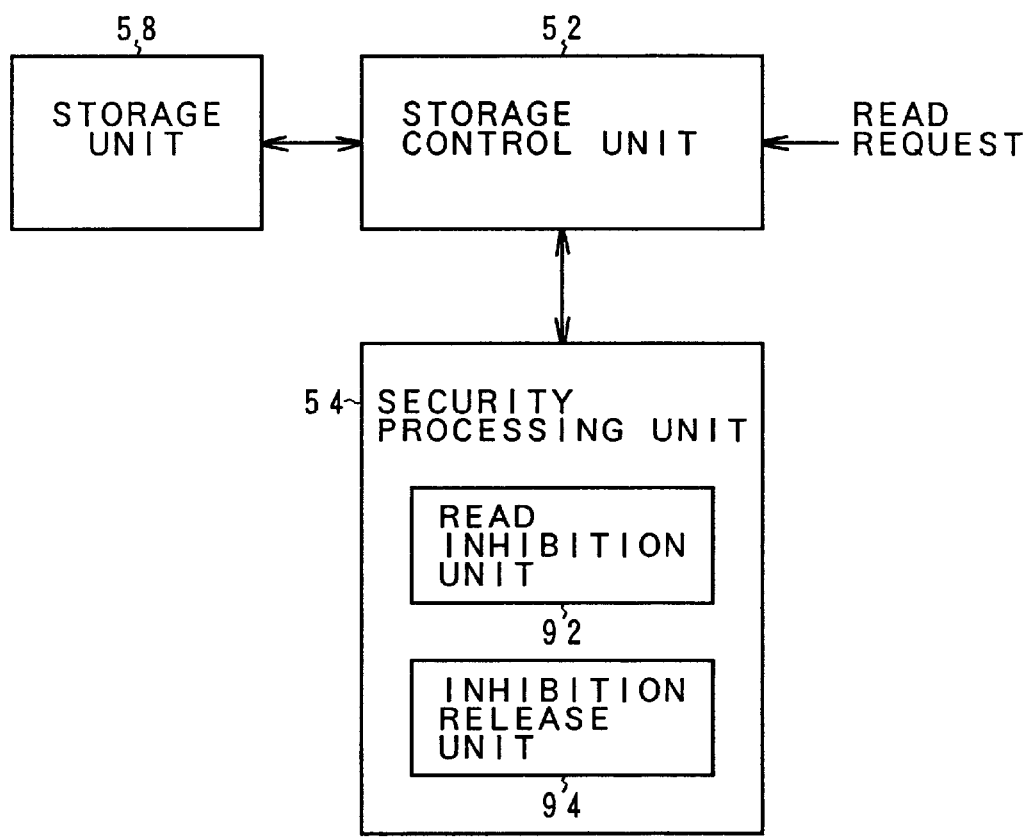
FIG. 15 is a function block diagram of the security processing unit of FIG. 14.

FIG. 15 illustrates a function of the security processing unit 54 of FIG. 14. The security processing unit 54 is provided with a read inhibition unit 92. The read inhibition unit 92 is activated upon the reception of a post of judgment that an unjust removal has occurred from the injustice judgment unit 56 in the power supply state after the reconnection of the memory board 20, and inhibits the execution of a read control of the storage unit 58 in response to the read demand to the storage control unit 52 from the exterior. For this reason, even though the memory board 20 has unjustly been removed and connected to the other apparatus to read out the storage unit 58, the read inhibition unit 92 of the security processing unit 54 performs the read inhibiting action through the storage control unit 52, thereby prohibiting an unjust read out of the data of the storage unit 58. The security processing unit 54 is further provided with an inhibition release unit 94. In the case where the user has retrieved the memory board 20 for reconnection after the execution of the read prohibition against the external read demand as a result of judgment of an unjust removal of the memory board 20, the inhibition release unit 94 of the security processing unit 54 is activated through the input of an encipher key from the processor 50 side, to release the read inhibition function against the read demand from the exterior, thereby making it possible to recover the ordinary state. It is to be noted that in the case of using the register 45 for the judgment of an unjust removal in FIG. 14, the power supply is interrupted due to the removal, so that a non-volatile register is used to prevent the contents from disappearing as a result of the interruption of the power supply.

Figure 16:
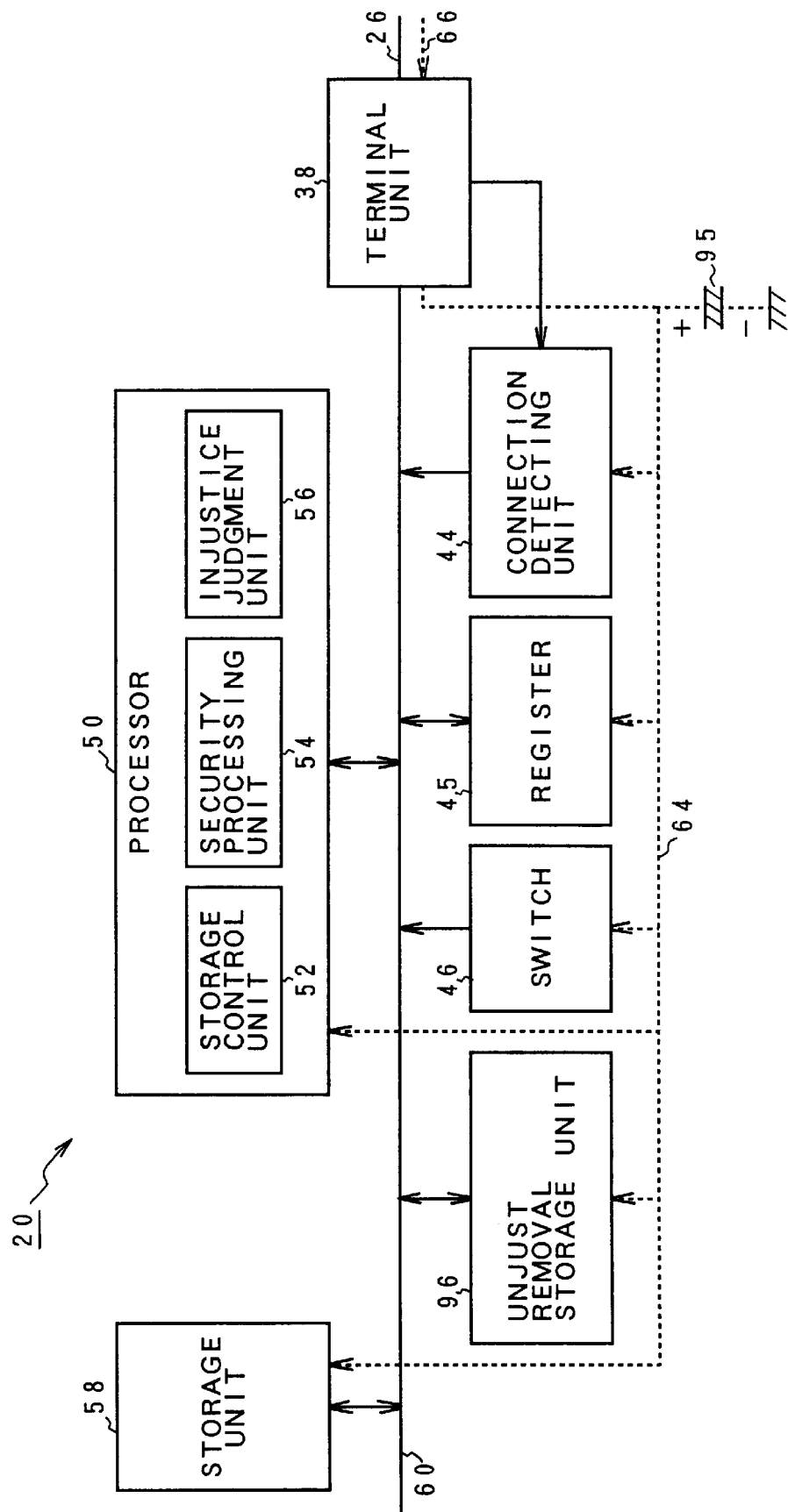
FIG. 16 is a block diagram of a further embodiment of the present invention, in which an unjust removal is stored and held and no batteries for protecting the information upon the reconnection are incorporated.

FIG. 16 illustrates a yet further embodiment of the storage apparatus in accordance with the present invention, which does not incorporate the battery. This embodiment is characterized in that upon the execution of the unjust removal of the memory board 20 the unjust removal is stored and held, allowing the information protection action to be performed on the basis of the memory of the unjust removal upon the reconnection. The memory board 20 is provided through the bus 60 with the processor 50 and the storage unit 58, the processor 50 being provided with the storage control unit 52, the security processing unit 54 and the injustice judgment unit 56. Associated with the bus 60 are the connection detecting unit 44, the register 45 and the switch 46, as well as an unjust removal storage unit 96. The unjust removal storage unit 96 stores and holds e.g., flag information indicative of an unjust removal which has been judged by the injustice judgment unit 56 at the time of removal of the memory board 20. The unjust removal storage unit 96 can be a non-volatile storage unit capable of holing the contents of the memory even though a power supply from the external power line 66 has been interrupted as a result of the removal of the memory board 20. The security processing unit 54 is actuated upon the reception of a power supply through the reconnection of the memory board 20, and executes the information protection processing of the storage unit 58 when it recognizes the judgment flag indicative of the unjust removal through the reference to the unjust removal storage unit 96. The information protection processing by the security processing unit 54 includes the execution of the function of the data destruction unit 68 of FIG. 5 and the function of the encipher unit 70 of FIG. 6.

Figure 17:
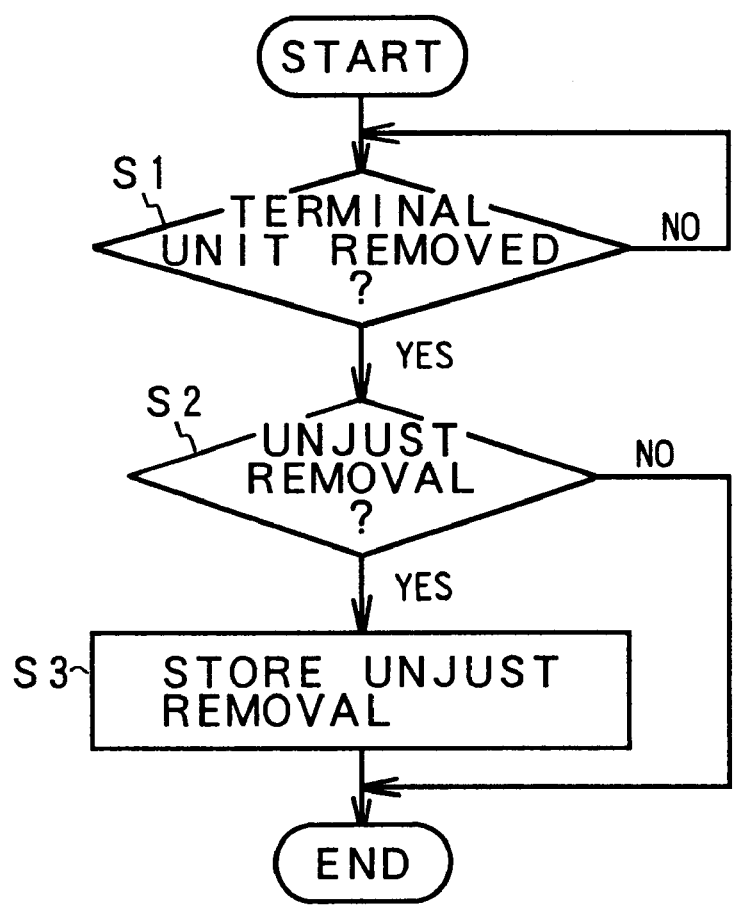
FIG. 17 is a flowchart of control processing upon the removal from the equipment of FIG. 16.

FIG. 17 illustrates processing executed at the time of removal of the memory board 20 in the embodiment of FIG. 16. First in step S1, a check is made to see if the connector terminal unit 38 has been removed or not, that is, a post of a removal detection has been issued or not from the connection detecting unit 44. If it is judged that the connector terminal unit 38 has been removed, then in step S2 a check is made by the injustice judgment unit 56 to see if an unjust removal has occurred or not. That is, reference is made to the switch 46 or the register 45, and it is judged that an unjust removal has occurred if it is inoperative or in an incorrect operation. When it is judged that an unjust removal has occurred, then in step S4 the injustice removal storage unit 98 stores and holds unjust removal flag information indicating that an unjust removal has taken place.

Figure 18:
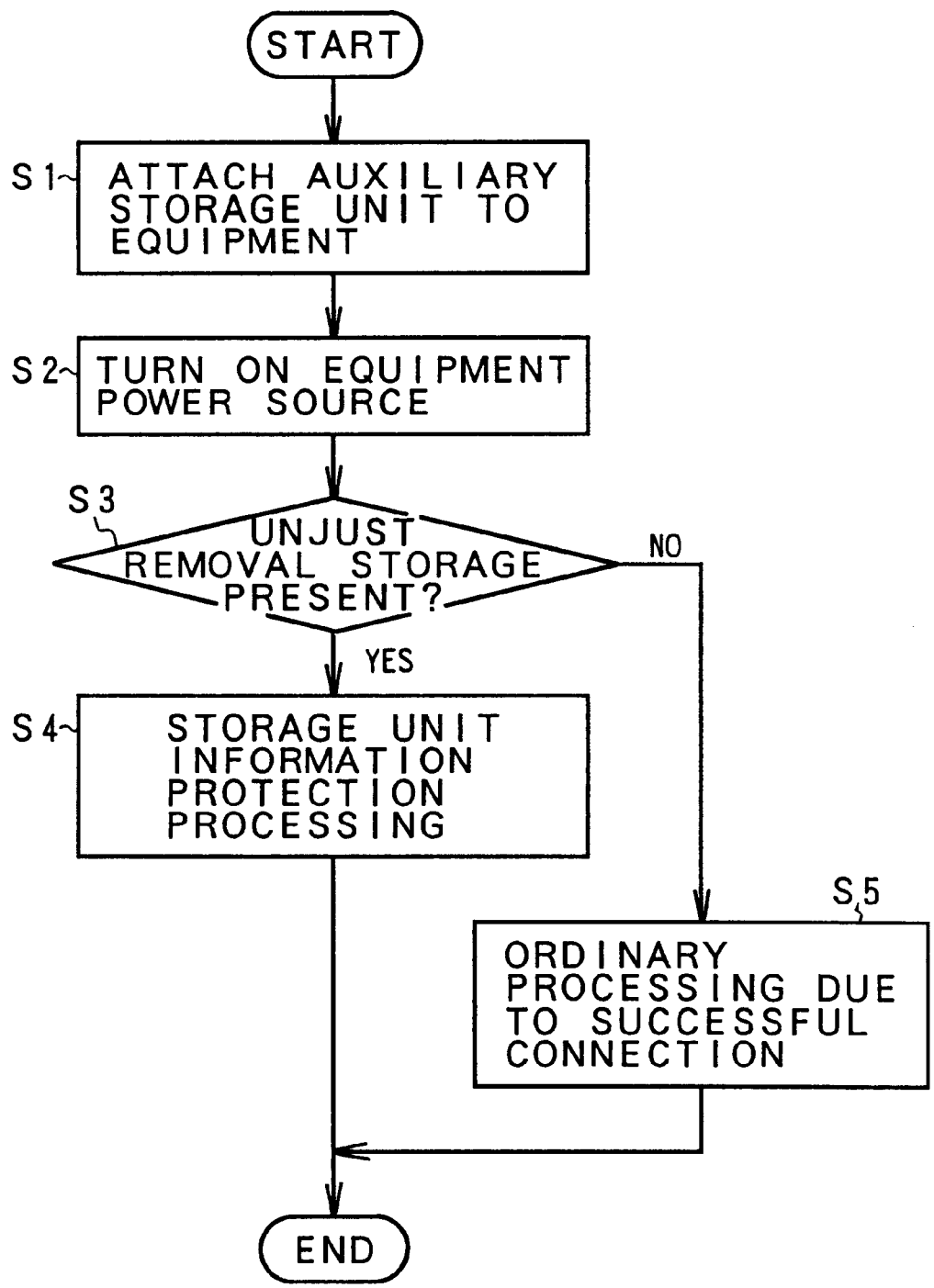
FIG. 18 is a flowchart of a protecting action when reconnection to the equipment is performed after the removal.

FIG. 18 illustrates processing executed when the reconnection has been made after the removal of the memory board 20 in FIG. 16. First in step S1, the memory board 20 serving as the storage unit is attached to the equipment, and in step S2 the power supply to the equipment is turned on and in step S3 the security processing unit 54 refers to the unjust removal storage unit 96 to check the presence or absence of the memory of the unjust removal. If any unjust removal memory exists, then in step S4 there is executed the information protecting processing of the storage unit 58. If in step S3 there is no unjust removal memory, then in step S5 ordinary processing is carried out as a result of the successful connection. It is to be noted that in FIG. 16 there are required the actions of detecting a removal of the connector terminal unit 38 to judge the unjust removal by the injustice judgment unit 56, to thereafter store it into the unjust removal storage unit 96, with the result that a capacitor 94 for backup is connected to the internal power line 64 to secure the power supply for this duration, thereby making it possible to be operated.

Figure 19:
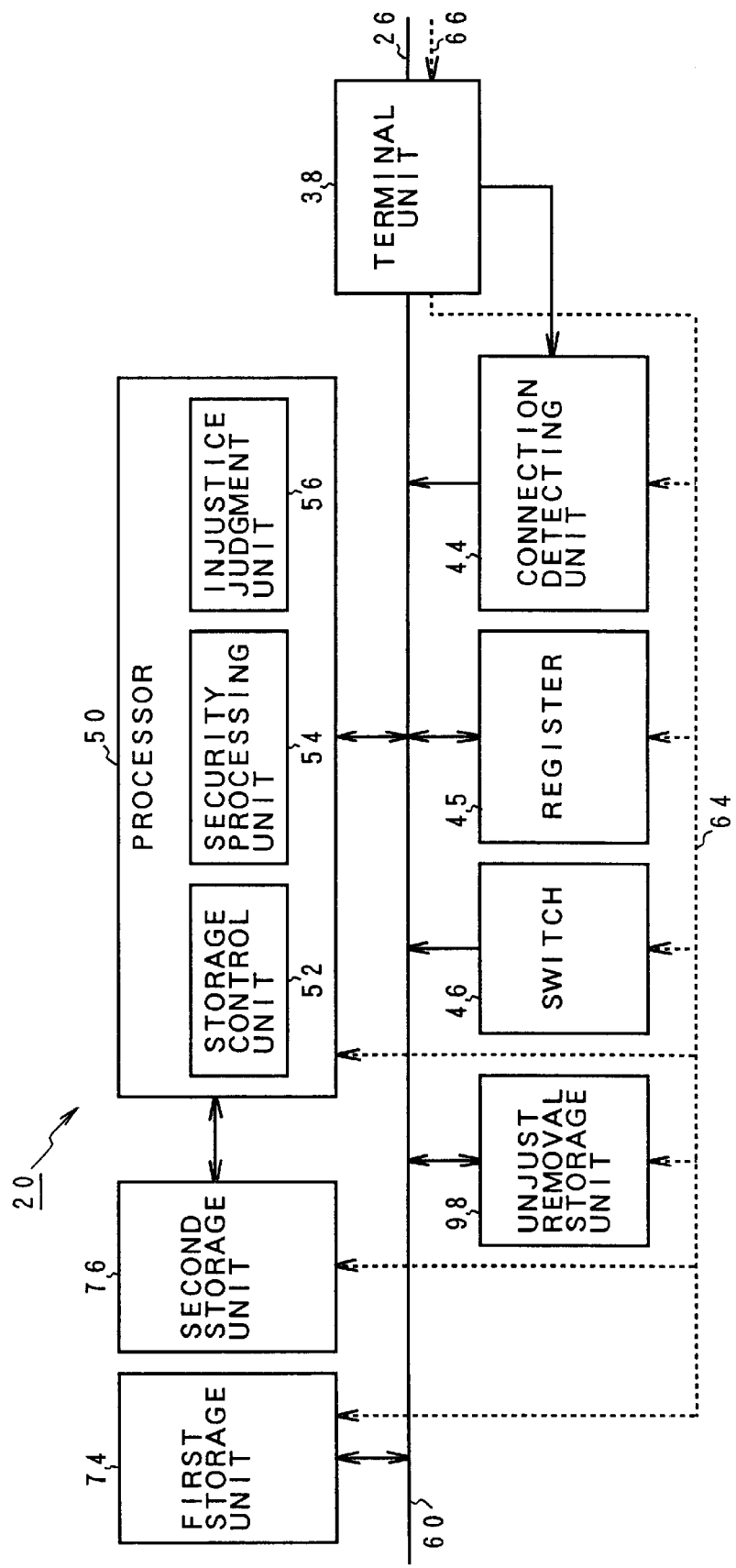
FIG. 19 is a block diagram of another embodiment of the present invention, in which an unjust removal is stored and held with no batteries for protecting the information upon the reconnection being incorporated.

FIG. 19 illustrates an embodiment in which information indicative of an unjust removal is stored and held at the time of the unjust removal of FIG. 16, with the information protective action being effected upon the reconnection. In this embodiment, the storage unit is divided into a first storage unit 74 and second storage unit 76 in the same manner as FIGS. 8 and 9, with the security processing unit 54 performing the protective action by the data destruction unit 77 of FIG. 9, that is, the protective action in which the data of the first storage unit 74 are transferred to the second storage unit 76 to render the data of the first storage unit 74 into meaningless data for destruction. Furthermore, the injustice storage unit 98 is the same as the embodiment of FIG. 16, with its processing action being also the same as in the flowchart of FIGS. 17 and 18.

Figure 20:
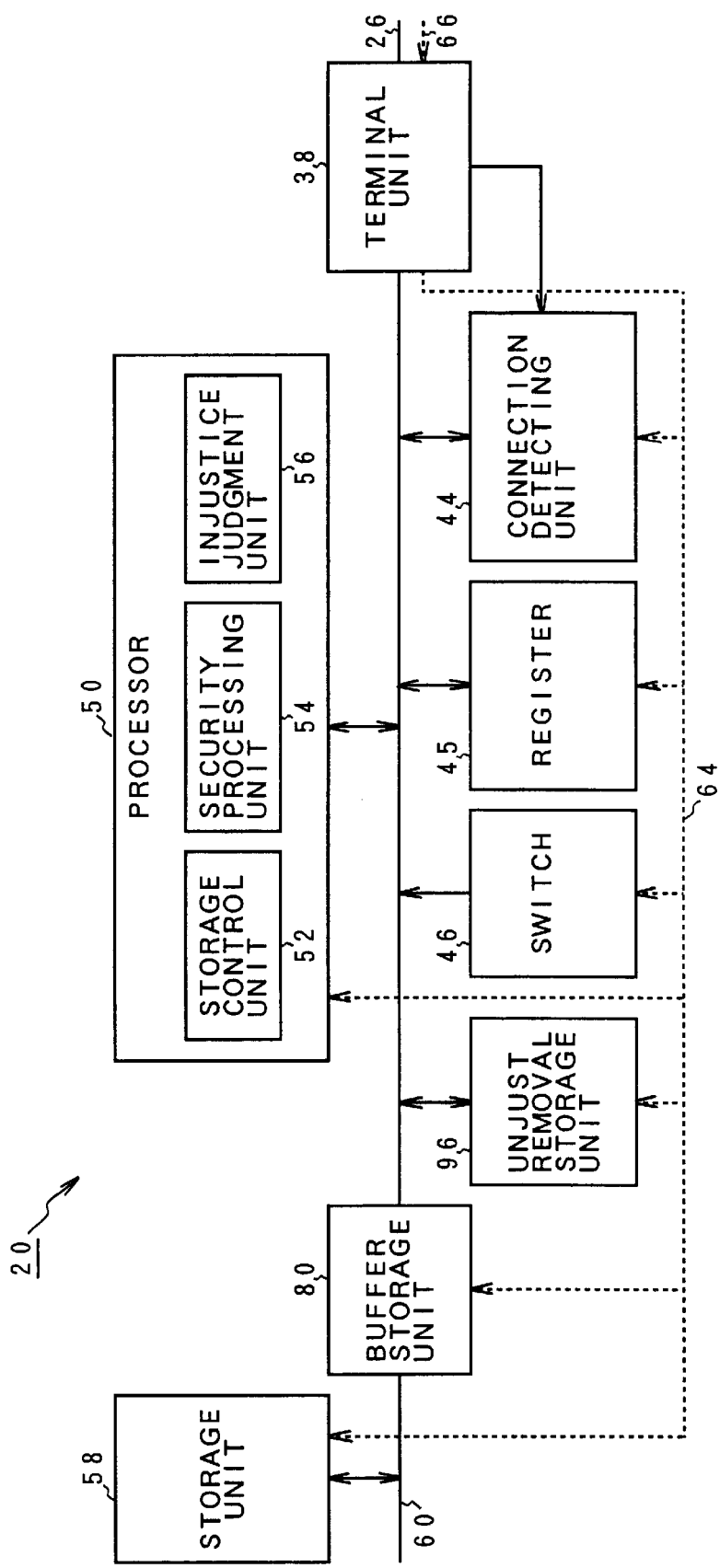
FIG. 20 is a block diagram of a further embodiment of the present invention, in which an unjust removal is stored and held with no batteries for protecting the information upon the reconnection being incorporated.

FIG. 20 illustrates another embodiment in which information indicative of an unjust removal is stored and held at the time of the unjust removal, with its information protective action being performed after the reconnection. This embodiment is provided with a buffer storage unit 80 in the same manner as FIGS. 10 and 11. In this case, the security processing unit 54 of the processor 50 has a function of the buffer data conversion unit 82 of FIG. 11, and when the injustice judgment unit 56 recognizes a memory of the unjust removal from the injustice removal storage unit 98 as a result of the reconnection, performs the processing for converting the read data from the storage unit 58 passing through the buffer storage unit 80 into meaningless data to thereby protect the stored data.

Figure 21:
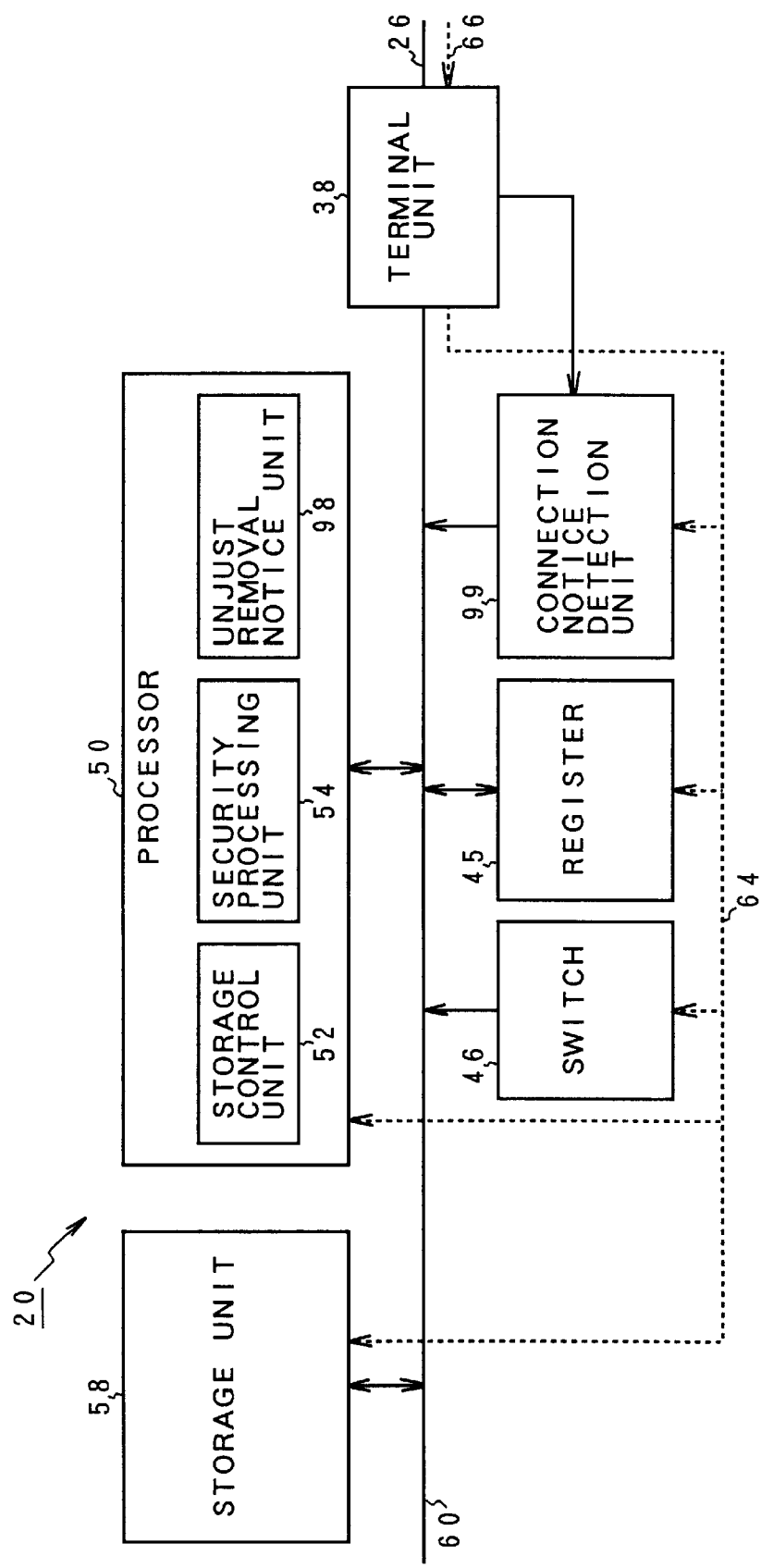
FIG. 21 is a block diagram of an embodiment of the present invention, in which an unjust removal is notified in advance with no batteries for protecting the information being incorporated.

FIG. 21 illustrates a further embodiment of the storage apparatus in accordance with the present invention, which incorporates no battery. This embodiment is characterized in that an initial motion is detected upon the removal of the memory board 20 to previously judge an unjust removal, thereby allowing the stored information protective action to be carried out until the time when the power supply is interrupted as a result of the removal. Associated with the bus 60 are the processor 50 and the storage unit 58, with the processing 50 being provided with an unjust removal notice unit 98 in addition to the storage control unit 52 and the security processing unit 54. The connector terminal unit 38 is associated with a connection previous detection unit 99. The connection previous detection unit 99 detects an initial motion at the time of disconnection of the connector terminal unit 38, and posts the unjust removal notice unit 98 of the processing 50 of a removal previous detection. The detection of initial motion upon the disconnection of the connector terminal unit 38 by the connection previous detection unit 99 includes the detection of an operation loosening the lock screw of the connector or an operation to remove the lock clip of the connector. Upon the reception of a removal notice from the connection previous detection unit 99, the unjust removal notice unit 98 refers to the switch 46 or the register 45 to judge the presence or absence of the unjust removal from its operative condition, allowing the security processing unit 54 to be activated if an unjust removal has taken place, causing the storage unit 58 to carry out the information protecting action. The information protecting action includes the destruction of the data of FIG. 5 and the encipher of FIG. 6. That is, the unjust removal notice unit 98 makes a judgment of an unjust removal upon the detection of an initial motion for the removal of the memory board 20 from the connector terminal unit 38, to thereby previously notify it, allowing the security processing unit 54 to perform the protective actions until the time when the power supply is interrupted as a result of the removal of the removal. The protective action for the storage unit 58 is provided as the power supply when the memory board is removed from the connector terminal unit 38, with not all of the data of the storage unit 58 but a part thereof being destroyed or enciphered, to make them imperfect, thereby providing a sufficient protection.

Figure 22:
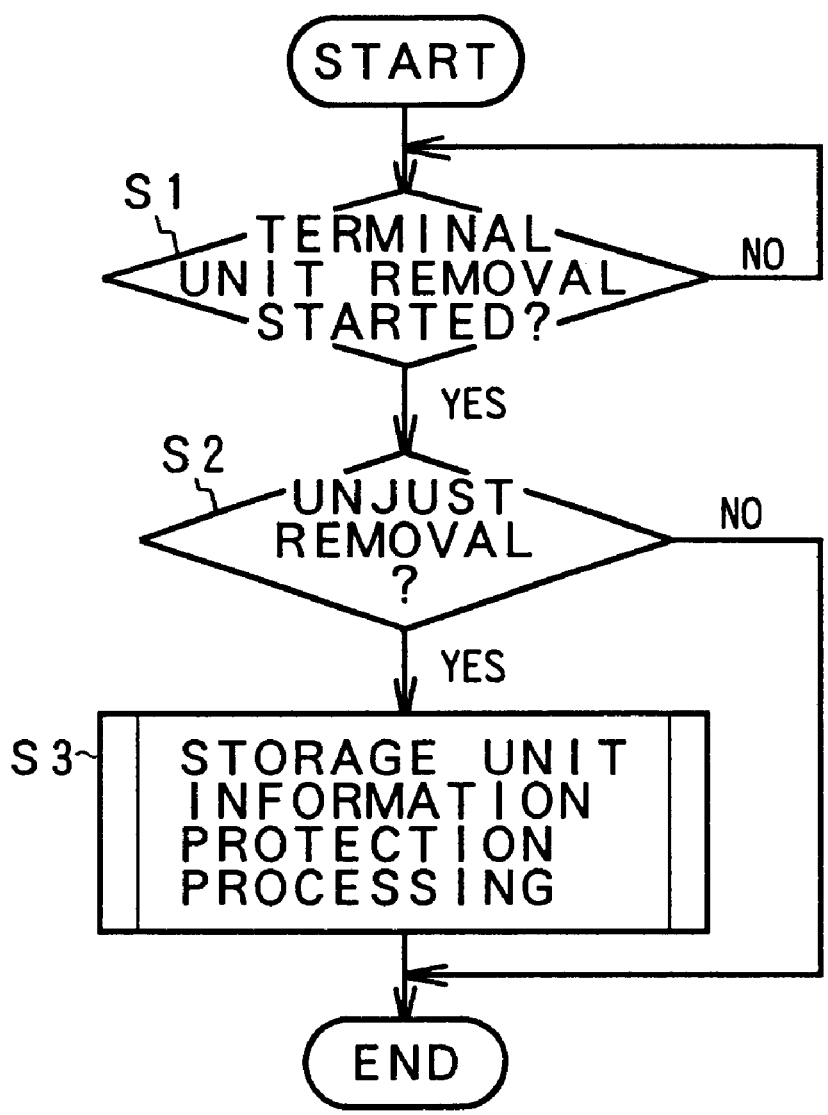
FIG. 22 is a flowchart of the control processing of FIG. 21.

FIG. 22 illustrates a processing action of FIG. 21. In step S1, a check is made to see if the removal of the connector terminal unit 38 has been started or not, and if the removal has been started, then in step S2 it is judged by the unjust removal notice unit 98 whether it is an unjust removal or not. If an unjust removal has been taken place, then in step S3 the security processing unit 54 executes the information protective processing for the storage unit 58.

Figure 23:
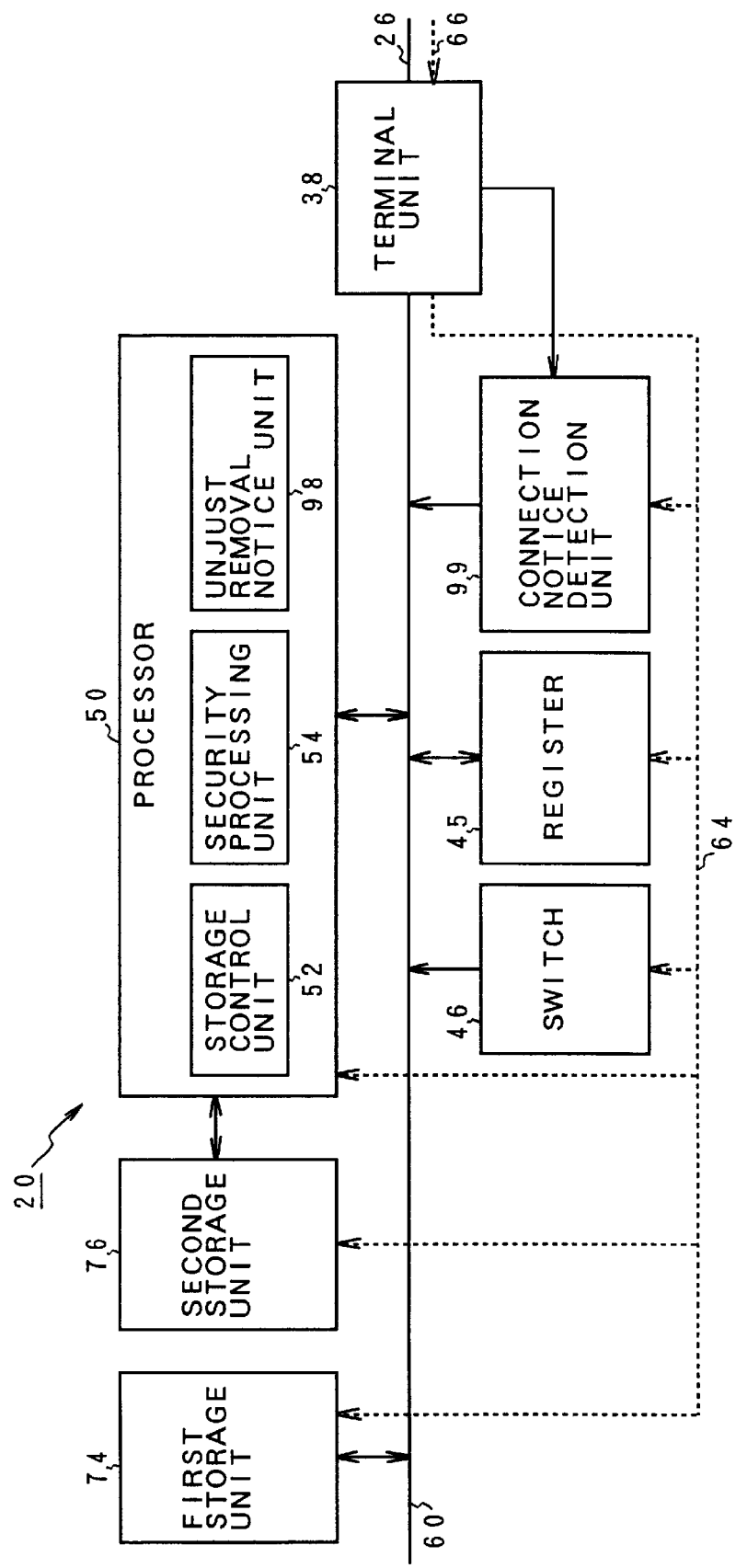
FIG. 23 is a block diagram of another embodiment of the present invention, in which an unjust removal is notified in advance with no batteries for protecting the information being incorporated.
Figure 24:
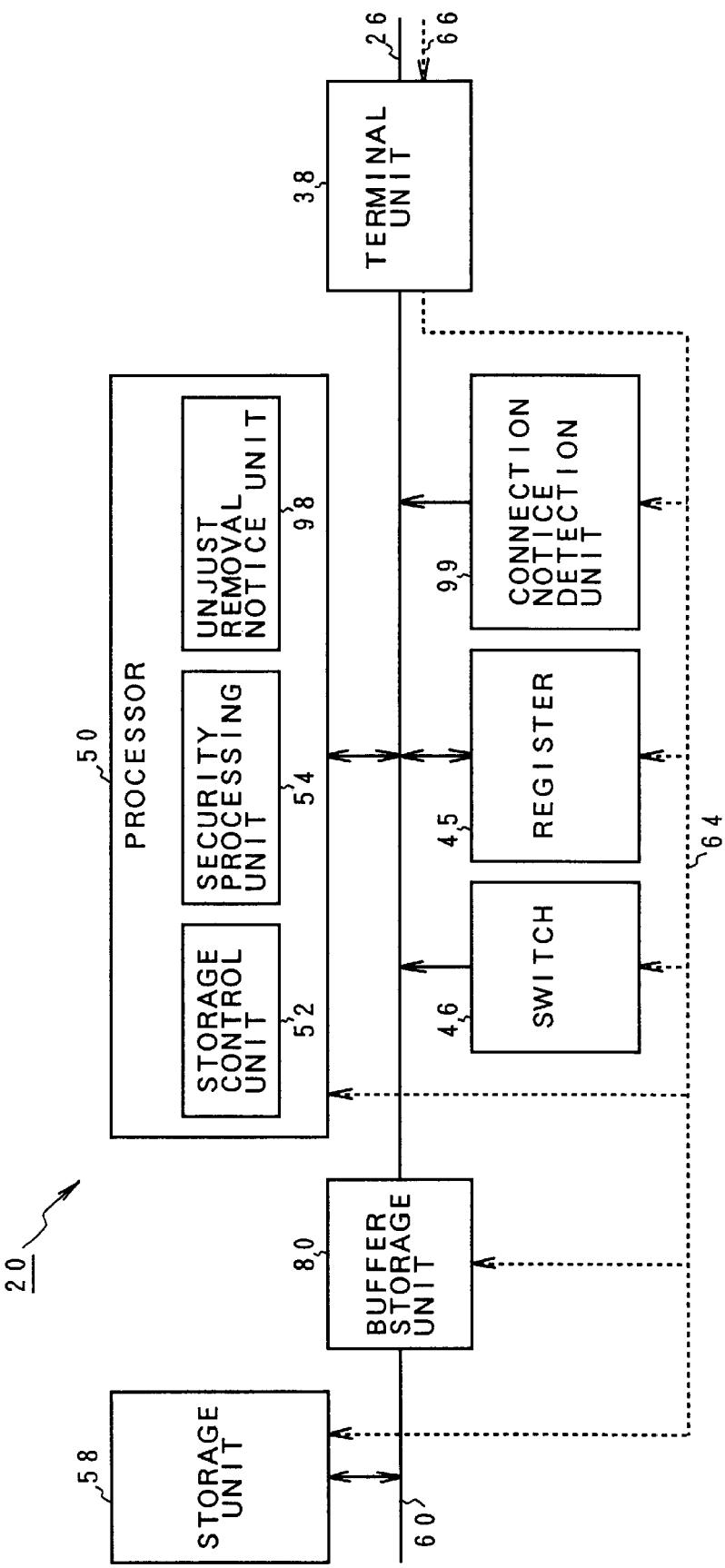
FIG. 24 is a block diagram of a further embodiment of the present invention, in which an unjust removal is notified in advance with no batteries for protecting the information being incorporated.

The embodiment of FIG. 23 is characterized in that the information protection for the storage unit by the unjust removal notice of FIG. 21 is applied separately to the first storage unit 74 and the second storage unit 76 in the same manner as FIG. 8. Furthermore, the embodiment of FIG. 24 is characterized in that the protection of the stored information by the unjust removal notice of FIG. 23 is effected by use of the buffer storage unit 80 in the same manner as FIG. 10.

Figure 25:
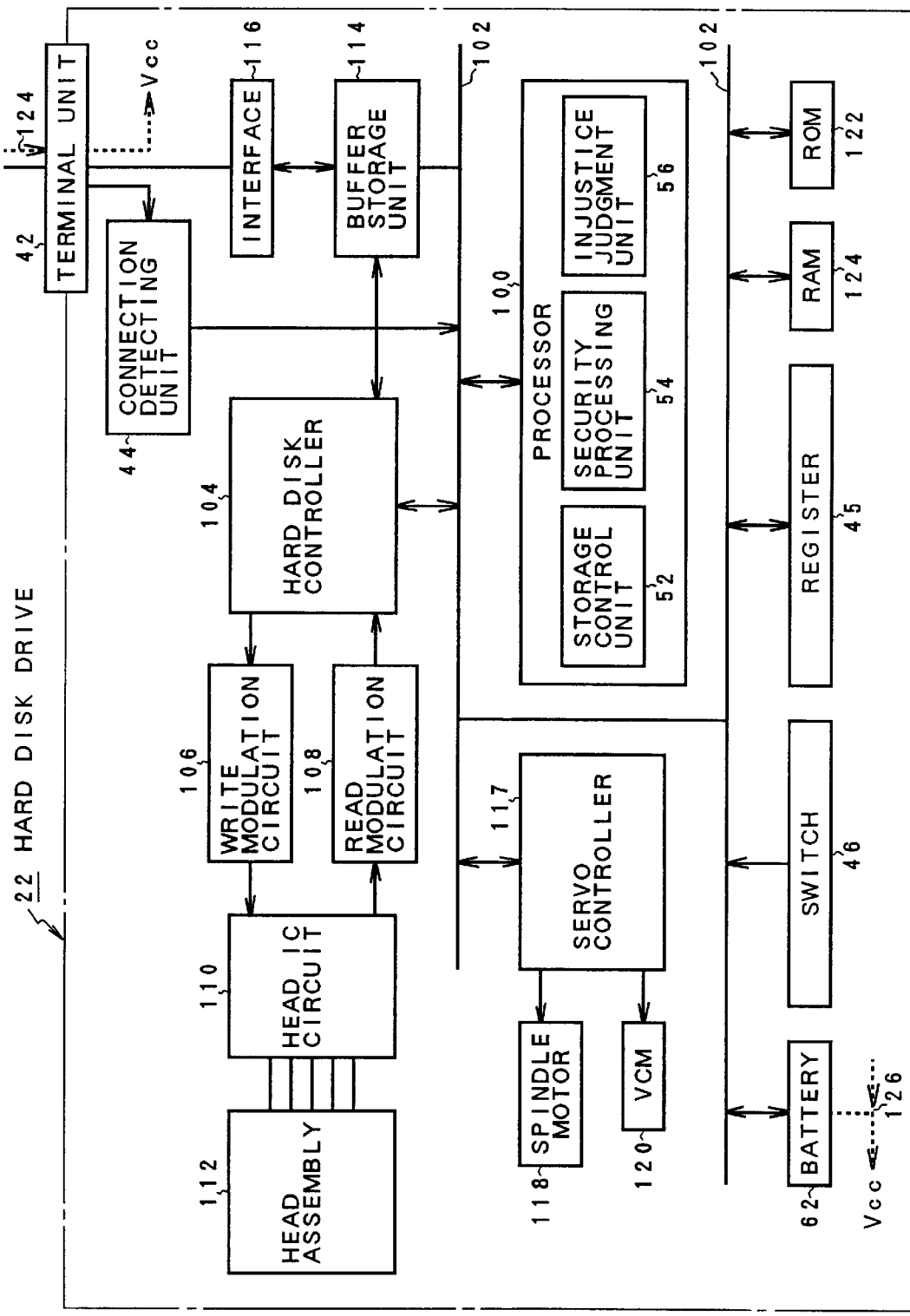
FIG. 25 is a block diagram of the present invention which has been applied to a hard disk drive.

FIG. 25 is a block diagram of a configuration of the hardware in which the present invention is applied to the hard disk drive 22 of FIG. 3. The hard disk drive 22 is provided with a processor 100, which is equipped with the storage control unit 52, the security processing unit 54 and the injustice judgment unit 56 in the same manner as the case of the memory board 20 of FIG. 4 for instance. It is natural that the control function effected by the storage control unit 52 be proper to the hard disk 22. Associated with a bus 102 of the processor 100 is a hard disk controller 104 to ensure that after the modulation of NRZ data by a write modulation circuit 106 any one of heads of a head assembly 112 is selected by way of a head IC circuit, to allow a disk medium not shown to be written. A read signal read from any one of the heads of the head assembly 112 is imparted through the head IC circuit 110 to a read demodulation circuit 108 to demodulate it as NRZ read data, which in turn are fed to the hard disk controller 104. The hard disk controller 104 is associated via the buffer storage unit 114 with an interface 116 with a host apparatus, the interface 116 being connected to the connector terminal unit 42. The connector terminal unit 42 is supplied with a power by way of an external power line 124. The connector terminal unit 42 is associated with the connection detecting unit 44 for detecting the removal and loading of the hard disk drive 22. The bus 102 of the processor 100 is associated with a servo controller 116, which performs a rotation control of a disk medium by a spindle motor 118 and a positioning control through a head actuator by a VCM 120. The bus 102 of the processor 100 is associated with a ROM 122 and a RAM 124, as well as the removal register 45, the switch 46 and the battery 62, which perform an information protecting action against an unjust removal. Such processing for protecting the stored data on a magnetic disk medium provided on the hard disk drive 22 is implemented by the connection detecting unit 44 associated with the connector terminal unit 42, the removal resister 45 operated from the processor side through the host apparatus, the switch 46 for performing a predetermined operation upon the removal of the hard disk drive 22, the battery for supplying the power upon the removal of the hard disk drive 22, and the unjust removal judgment unit 56 and the security processing unit 54 which are provided in the processor 100. Since in this case the battery 62 is incorporated, the memory board 20 can employ in a selective manner the embodiments of FIGS. 4, 8, 10 and 12. In the case where no battery 62 is provided, a selective application is allowed of the embodiments shown in FIGS. 14, 16, 19, 20, 21, 23 and 24.

According to the present invention, even though the equipment has been disassembled to remove the storage apparatus such as an internal memory board or an internal hard disk drive to thereafter connect it to another system for unjustly accessing the data, it is judged upon the removal of the storage apparatus that an unjust removal has taken place, allowing the execution of erasing of the data of the storage unit, enciphering, saving into another area, a erasing by the transfer buffer upon the reconnection to another system, and the inhibition of access against the read demand, so that it makes it impossible to read the data from the unjustly removed storage unit to the exterior, thereby achieving an improvement in the security performances of the equipment through the secure prevention of an unjust access to the stored data of the storage apparatus assembled into the equipment.

Although the auxiliary apparatus of the above embodiments were in the form of a memory board and a hard disk drive by way of example, any auxiliary apparatus would be available as long as it is freely attachable to the equipment such as a personal computer. It will be appreciated that although the above embodiments employ the personal computer as the equipment, they are applicable intactly to any equipment using the storage apparatus.

What is claimed is:

1. A storage apparatus for equipment, assembled into the equipment in use, said apparatus comprising:

a storage unit storing information;

a connection detecting unit detecting a removal of the storage apparatus from the equipment;

an injustice judgment unit judging when said connection detecting unit has detected a removal from the equipment whether the removal is an unjust removal responsive to a predefined switch operation; and a security processing unit executing protecting action preventing leakage of the information stored in said storage unit when said injustice judgment unit has judged that an unjust removal from the equipment has taken place.

2. A storage apparatus according to claim 1, further comprising a battery incorporated for the supply of power upon the removal from the equipment.

3. A storage apparatus according to claim 1, wherein
   said injustice judgment unit is provided with a switch which is required to be mechanically operated upon a removal from the equipment, said injustice judgment unit judging that an unjust removal has taken place when said switch has been removed without any operation or with an incorrect operation.

4. A storage apparatus according to claim 1, wherein
   said injustice judgment unit is provided with a register which is required to be operated by a software upon a removal from the equipment, said injustice judgment unit judging that an unjust removal has taken place when said register has been removed without any operation or with an incorrect operation.

5. A storage apparatus according to claim 1, further comprising a storage control unit controlling read and write of information from and to said storage unit.

6. A storage apparatus according to claim 1, wherein said security processing unit is provided with a data destruction unit writing meaningless data into said storage unit to destroy the original data when it is judged that an unjust removal has taken place.

7. A storage apparatus according to claim 1, wherein said security processing unit is provided with an enchipher unit enciphering the data of said storage unit when it is judged that an unjust removal has taken place.

8. A storage apparatus according to claim 7, wherein said security processing unit is provided with a decoding unit restoring data enciphered by said encipher unit into original data.

9. A storage apparatus according to claim 1, wherein said storage unit is provided with a first storage area for use in an ordinary state and a second storage area out of use in the ordinary state, and wherein said security processing unit is provided with a data destruction unit which when it is judged that an unjust removal has taken place, copies data of said first storage area into said second storage area and writes meaningless data to said first storage area to thereby destroy the original data.

10. A storage apparatus according to claim 9, wherein said security processing unit is further provided with a data recovery unit returning data stored in said second storage area into said first storage area.

11. A storage apparatus according to claim 1, wherein it further comprises a buffer storage unit disposed between said storage unit and an equipment connection terminal unit, and wherein said security processing unit is provided with a buffer data conversion unit which when data are fetched via said buffer storage unit from said storage unit after the judgment of an unjust removal, converts them into meaningless data in said buffer storage unit.

12. A storage unit according to claim 1, wherein said security processing unit is further provided with a conversion inhibition unit inhibiting the conversion by said buffer data conversion unit into meaningless data.

13. A storage unit according to claim 1, wherein said security processing unit is provided with a circuit destruction unit which when it is judged that an unjust removal has taken place, destroys a circuit function at a predetermined site of the apparatus to thereby disable said read control unit for a data read from said storage unit.

14. A storage apparatus according to claim 1, wherein said storage apparatus is in the form of a memory card or a hard disk drive which is freely attachable to and detachable from the equipment.

15. A storage apparatus assembled into the equipment in use, said apparatus comprising:

a storage unit storing information;

a connection detecting unit detecting a removal of the storage apparatus from the equipment;

an injustice judgment unit judging when said connection detecting unit has detected a removal from the equipment whether the removal is an unjust removal from the equipment or not; and a security processing unit executing protecting action preventing leakage of the information stored in said storage unit upon reconnection after said injustice judgment unit has judged that an unjust removal taken place.

16. A storage unit according to claim 15, wherein said security processing unit is provided with a read inhibition unit inhibiting said storage control unit from reading data from said storage unit upon the reception of a read demand from the exterior as a result of reconnection after said injustice judgment unit has judged that an unjust removal has taken place.

17. A storage unit according to claim 16, wherein said securing processing unit is further provided with an inhibition release unit releasing a read inhibiting action against a read demand from said storage control unit by said read inhibition unit.

18. A storage apparatus according to claim 15, wherein said storage apparatus is in the form of a memory card or a hard disk drive which is freely attachable to and detachable from the equipment.

19. A storage apparatus for equipment, assembled into the electronic equipment in use, said apparatus comprising:

a storage unit storing information;

a connection detecting unit detecting a removal of the storage apparatus from the equipment;

an injustice judgment unit judging when said connection detecting unit has detected a removal from the equipment whether the removal is an unjust removal or not;

an unjust removal storage unit which when said injustice judgment has judged that an unjust removal has taken place, stores and holds the unjust removal; and a security processing unit which when it has been enabled for action as a result of reconnection to the equipment after the removal, executes protecting action preventing leakage of the information stored in said storage unit on the basis of memory of said unjust removal.

20. A storage apparatus according to claim 19, wherein said storage apparatus is in the form of a memory card or a hard disk drive which is freely attachable to and detachable from the equipment.

21. A storage apparatus detachably assembled into equipment in use, said apparatus comprising:

a storage unit storing information;

an unjust removal notice unit judging an unjust removal from an initial motion upon the removal of the storage apparatus from the equipment to notify a user of the unjust removal in advance; and a security processing unit executing protecting action preventing leakage of the information stored in said storage unit on the basis of said notice of an unjust removal before the actual removal from the equipment, in the pre-removal external power supply state while connected to the equipment.

22. A storage apparatus according to claim 21, wherein said storage apparatus is in the form of a memory card or a hard disk drive which is freely attachable to and detachable from the equipment.

23. A storage apparatus used in equipment, said apparatus comprising:

a storage unit storing information;

a connection detecting unit detecting a removal of the storage apparatus from the equipment;

an injustice judgment unit in communication with the connection detecting unit and determining unauthorized removal of the storage apparatus from the equipment; and a security processing unit responsive to a result of the injustice judgment unit and executing protecting action, with or without internal supply of power, preventing leakage of the information stored in the storage unit.

* * * * *